United States Patent [19]
Suzuki

[11] Patent Number: 5,923,497
[45] Date of Patent: Jul. 13, 1999

[54] CASSETTE TYPE RECORDING AND REPRODUCING APPARATUS

[75] Inventor: Katsuhiro Suzuki, Kanagawa, Japan

[73] Assignee: Sony Corporation, Tokyo, Japan

[21] Appl. No.: 08/954,758

[22] Filed: Oct. 20, 1997

Related U.S. Application Data

[62] Division of application No. 08/772,402, Dec. 23, 1996, Pat. No. 5,793,565.

[30] Foreign Application Priority Data

Dec. 26, 1995 [JP] Japan .................................. 7-350739

[51] Int. Cl.$^6$ .................................................. G11B 5/008
[52] U.S. Cl. ............................................................ 360/96.5
[58] Field of Search .................................. 360/85, 94, 95, 360/96.5

[56] References Cited

U.S. PATENT DOCUMENTS

| | | | |
|---|---|---|---|
| 5,402,405 | 3/1995 | Shiomi | 360/94 |
| 5,497,279 | 3/1996 | Nishijima | 360/96.5 |
| 5,566,368 | 10/1996 | Yamashita | 360/96.5 |

Primary Examiner—A. J. Heinz
Attorney, Agent, or Firm—Frommer Lawrence & Haug, LLP.; William S. Frommer

[57] ABSTRACT

A cassette type recording and reproducing apparatus with which it is possible to use tape cassettes of a plurality of different sizes wherein the overall space in the cassette insertion direction occupied by a cassette discriminating member and a cassette insertion guide for ensuring correct insertion of small cassettes is made small so that a cassette stage for carrying cassettes from the vicinity of a front panel to a loading position inside the apparatus where recording and reproducing of information are carried out can be brought amply close to the front panel and the front-rear direction depth of the cassette stage can be made long to enable cassettes to be held firmly and stably on the cassette stage and the tape cassettes are pressed in optimum positions near their reel centers onto the cassette stage with a stronger force during loading than during ejecting so that slipping of the tape cassettes on the cassette stage during loading is prevented and during ejecting the tape cassettes can be smoothly and certainly ejected and small tape cassettes are ejected through a greater distance than large tape cassettes so that both large and small tape cassettes project outside the front panel by a suitable distance after they are ejected.

8 Claims, 28 Drawing Sheets

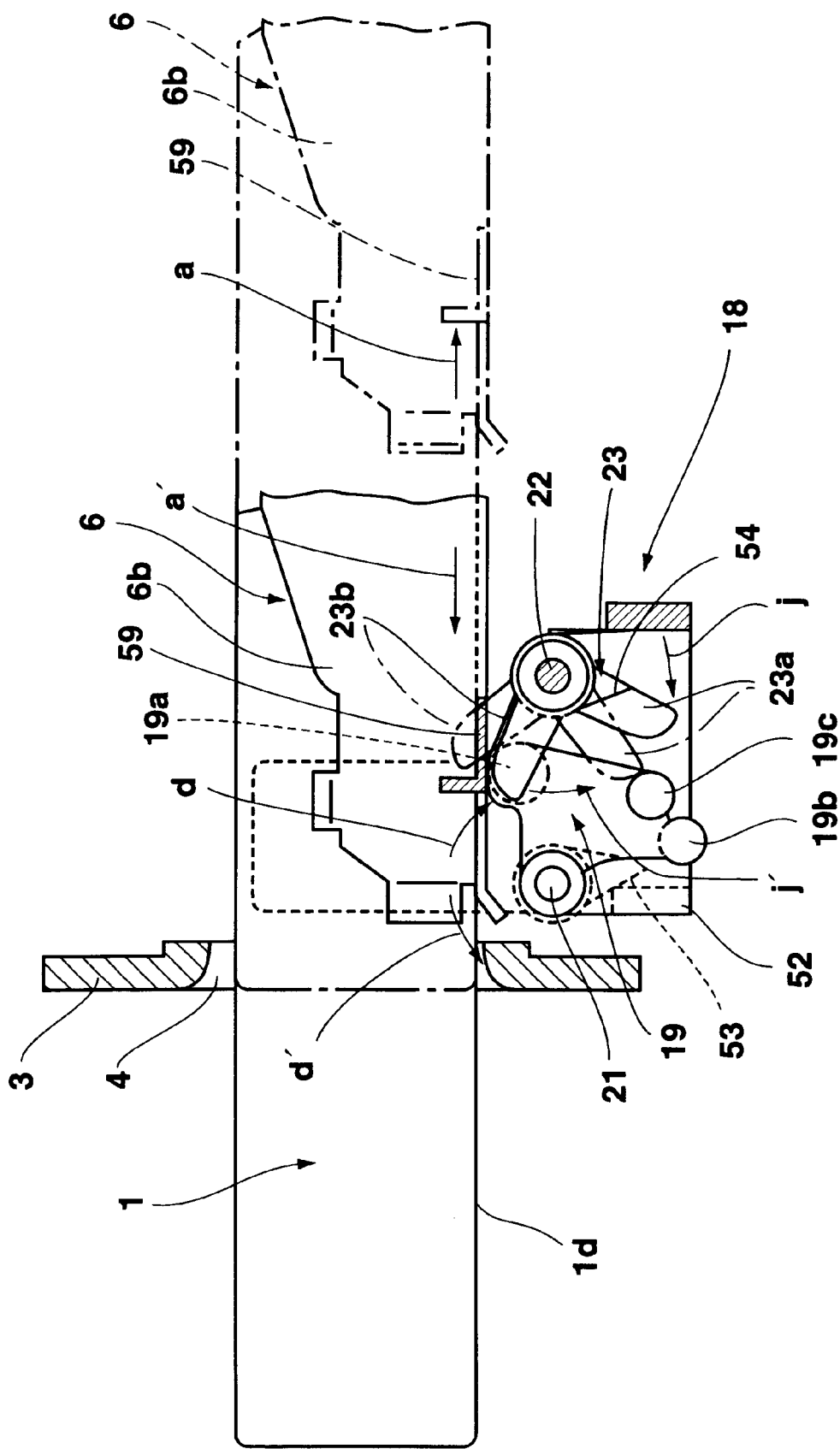

CASSETTE TYPE RECORDING AND REPRODUCING APPARATUS

This application is a division of application Ser. No. 08/772,402, filed Dec. 23, 1996 U.S. Pat. No. 5,793,565.

BACKGROUND OF THE INVENTION

1. Field of the Invention

This invention relates to a cassette type recording and reproducing apparatus such as a video cassette recorder for carrying out recording and reproducing of information using a tape cassette.

2. Description of the Related Art

There have been cassette type recording and reproducing apparatuses such as video tape recorders with which it is possible to selectively use two kinds of tape cassette 1, 2 whose front-rear depths $D_1$, $D_2$ and thicknesses $H_1$, $H_2$ differ as shown in FIGS. 1A and 1B. In this kind of cassette type recording and reproducing apparatus, a cassette stage 6, which is cassette carrying means, is disposed on the inner side of a horizontally long cassette insertion opening 4 formed in a front panel 3 and reciprocates in the arrow a, b and a', b' directions along a substantially L-shaped locus of movement between a cassette insertion position $P_1$, a cassette pulling in position $P_2$ behind that and a cassette loading position $P_3$ below that.

Cassette discriminating blocks 9 for discriminating the type (large or small) of a tape cassette 1 or 2 and cassette insertion guide blocks 10 changed over by these cassette discriminating blocks 9 are arranged in series in the arrow a direction, which is a cassette insertion direction, on the inner side of the cassette insertion opening 4.

Also, a cassette pressing roller 7, which is cassette pressing means for pressing the cassette 1 or 2 onto a bottom plate 6a of the cassette stage 6, is mounted on the cassette stage 6.

A cassette ejecting lever 8, which is cassette ejecting means for ejecting the cassette 1 or 2 through the cassette insertion opening 4, is also mounted on the cassette stage 6.

A cassette type recording and reproducing apparatus of the related art having the kind of construction described above operates in the following way.

At times of cassette loading, a tape cassette 1 or 2 is inserted through the cassette insertion opening 4 into the cassette stage 6 in the arrow a direction so that it pushes open an opening and closing cover 5. When the tape cassette 1 or 2 is inserted, first, the cassette discriminating blocks 9 discriminate the type (size) of the tape cassette 1, 2 and change over the cassette insertion guide blocks 10. That is, when a large tape cassette 2 is inserted, the cassette discriminating blocks 9 remove the cassette insertion guide blocks 10 in the cassette insertion direction, and when a small tape cassette 1 is inserted, the cassette insertion guide blocks 10 guide this small tape cassette 1 to a central position in the left-right direction of the cassette stage 6 and prevent the small tape cassette 1 from being mis-inserted to an off-center position to the right or the left of the center of the cassette stage 6.

Then, the tape cassette 1 or 2 inserted into the cassette stage 6 horizontally is pressed onto the bottom plate 6a by the cassette pressing roller 7 constituting cassette pressing means.

After that, by a cassette loading mechanism (not shown) the cassette stage 6 is pulled in from the cassette insertion position $P_1$ to the cassette pulling in position $P_2$ in the arrow a direction horizontally and then lowered from the cassette pulling in position $P_2$ to the cassette loading position $P_3$ in the arrow b direction vertically, and the tape cassette 1 or 2 is thereby loaded into the cassette loading position $P_3$. At this time, a front cover 1A, 2A fitted to the front end 1a, 2a of the tape cassette 1, 2 is opened upward in the arrow b' direction.

At this time, the tape cassette 1 or 2 is positioned by being fitted onto positioning pins (not shown) in the cassette loading position $P_3$, the cassette stage 6 is moved to a position slightly below the cassette loading position $P_3$ and a gap $G_1$ is created between the underside of the tape cassette 1, 2 and the bottom plate 6a of the cassette stage 6, but the tape cassette 1, 2 is stably loaded because it is strongly pressed upon by the cassette pressing roller 7 in the arrow b direction into the cassette loading position $P_3$.

After this cassette loading operation, a magnetic tape inside the tape cassette 1, 2 is pulled out of the cassette and loaded onto a rotating head drum (not shown) by a tape loading mechanism (not shown), and recording and/or reproducing of information are carried out.

When the tape cassette 1 or 2 is ejected after recording and reproducing have been finished, by an operation opposite to that of the cassette loading operation described above, the cassette stage 6 is raised from the cassette loading position $P_3$ to the cassette pulling in position $P_2$ in the arrow b' direction vertically and then moved to the cassette insertion position $P_1$ in the arrow a' direction horizontally and the tape cassette 1, 2 is ejected by the cassette ejecting lever 8, which is cassette ejecting means, through the cassette insertion opening 4 to outside the front panel 3.

In cassette type recording and reproducing apparatuses wherein when a tape cassette 1 or 2 is being loaded the tape cassette 1 or 2 is inserted to such a position that in the case of a small tape cassette 1 the rear end 1b of the small tape cassette 1 becomes substantially aligned with the front panel 3, as shown in FIG. 1A, at times of cassette ejection, the small and large tape cassettes 1 and 2 are both ejected from the cassette stage 6 in the arrow a' direction by the cassette ejecting lever 8 through the same fixed distance $L_1$, as shown in FIG. 1B, so that when the cassette stage 6 has been returned to the cassette insertion position $P_1$, when the tape cassette is a small tape cassette 1 the rear end 1b of this tape cassette 1 is made to project to outside the front panel 3 by the fixed distance $L_1$ in the arrow a' direction and the rear end 1b of the tape cassette 1 can be easily gripped by hand and taken out of the cassette stage 6 to outside the front panel 3.

However, in a cassette type recording and reproducing apparatus of the related art constructed and operating as described above, there have been the following four problems.

The first concerns the cassette discriminating blocks 9 and the cassette insertion blocks 10.

That is, the cassette insertion distance through which a cassette must be inserted to make the cassette discriminating blocks 9 function is very long, and the space $S_{11}$ in the cassette insertion direction (the arrow a direction) occupied by the cassette discriminating blocks 9 has been very large. Furthermore, because the cassette discriminating blocks 9 and the cassette insertion guide blocks 10 have been arranged in series, the overall space $S_{12}$ occupied by the these two blocks has been very large. Because the cassette stage 6 is positioned further back (in the arrow a direction) than the cassette insertion guide blocks 10, when this occupied space $S_{12}$ becomes large the depth (the length in the arrow a direction) $D_{11}$ of the cassette stage 6 becomes short. Since the depth $D_{11}$ of the cassette stage 6 greatly influences the holding force with which the tape cassette 1, 2 is held, when this depth $D_{11}$ is short this holding force on the tape cassette 1, 2 is weak at times of loading and cassette loading errors such as the tape cassette coming off the cassette stage 6 part-way through loading have readily occurred.

The second problem concerns the cassette ejection stroke of the cassette ejecting lever 8, which is cassette ejecting means.

That is, cassette ejecting means such as cassette ejecting levers of the related art have not had any function whatsoever discriminating the front-rear depths $D_1$, $D_2$ or the thicknesses $H_1$, $H_2$ of the tape cassettes 1, 2, and at times of cassette ejecting have ejected the tape cassettes 1, 2 from the cassette stage 6 in the arrow a' direction through the same fixed distance $L_1$ irrespective of the front-rear depth and thickness of the tape cassette 1, 2, as shown in FIG. 1B. Consequently, as shown in FIG. 1B, the distance $L_4$ by which the rear end 2b of the large tape cassette 2 projects outside the front panel 3 has been much greater than the distance $L_1$ by which the small tape cassette 1 projects outside the front panel 3.

With this kind of construction, when a large tape cassette 2 is ejected, there has been a risk of the rear end 2b projecting a long way outside the front panel 3 striking and injuring the hand or body of a user or of the cassette loading mechanism breaking under loads acting at this time or of the tape cassette falling out of the cassette insertion opening 4.

The third problem concerns the cassette pressing force exerted by the cassette pressing means (in the example described above, the cassette pressing roller 7).

That is, with cassette pressing means of a related art construction, during cassette loading, as shown in FIG. 1C, it has sometimes happened that the cassette pressing force of the cassette pressing roller 7 or the like is too weak and consequently when the cassette stage 6 is pulled in the arrow a direction from the cassette insertion position $P_1$ to the cassette pulling in position $P_2$ the tape cassette 1 slips on the cassette stage 6 due to inertial force, resulting in a position error $L_2$. With this kind of construction, mis-loading errors wherein the tape cassette 1 cannot be correctly loaded when the cassette stage 6 is lowered to the cassette loading position $P_3$ have tended to occur.

There have also been problems such as that at times of cassette ejecting the cassette pressing force of the cassette pressing roller 7 is too strong and consequently the distance $L_3$ through which the tape cassette 1 is ejected by the cassette ejecting lever 8 or the like is insufficient and it is difficult to take the tape cassette 1 out from the front panel 3.

In other words, with cassette pressing means of constructions of the related art, because the cassette pressing force on the tape cassette 1 or 2 has been substantially the same during cassette loading and during cassette ejecting, the kinds of problem described above have occurred.

The fourth problem has concerned the disposition of the cassette pressing means (for example the cassette pressing roller 7).

That is, as shown in FIG. 1A, the cassette pressing roller 7 has been disposed in a limited space where so that it does not interfere with the inwardly opening type opening and closing cover 5 when the cassette stage 6 has been returned to the cassette insertion position $P_1$ it is on the front side of a space $S_1$ through which that opening and closing cover 5 moves and also so that it does not interfere either with a front cover 1A or 2A of the tape cassette it is on the rear side (the arrow a' direction side) of a space $S_3$ through which the front cover 1A or 2A moves.

However, with this kind of construction, the cassette pressing roller 7 is disposed greatly displaced to the front side of reel centers $P_{11}$, $P_{12}$, which respectively are the front-rear direction positions of the centers of gravity of the tape cassettes 1 and 2, and when the cassette pressing roller 7 presses the tape cassette 1 or 2 in the arrow b direction in the cassette loading position $P_3$ this pressing state is unstable and the travel of the magnetic tape is consequently unstable and this causes recording and reproducing errors.

Although there have been cassette type recording and reproducing apparatuses of this kind in the related art wherein when the tape cassette 1 or 2 is being pulled into the cassette stage the cassette pressing roller 7 is driven by a motor and the tape cassette is thereby forcibly pulled in through the cassette insertion opening 4, with this kind of construction there has been the problem that the mechanism is markedly more complicated and consequently the cost of the apparatus increases.

SUMMARY OF THE INVENTION

The present invention was made to solve these four problems and other problems, and a first object of the invention is to provide a cassette type recording and reproducing apparatus wherein the overall space in the cassette insertion direction occupied by a cassette discriminating member and a cassette insertion guide can be made small so that the cassette stage can be brought amply close to the front panel and the front-rear depth of the cassette stage can be made amply long.

A second object of the invention is to provide a cassette type recording and reproducing apparatus wherein the distance through which a small tape cassette is ejected can be made large and the distance through which a large tape cassette is ejected can be made small.

A third object of the invention is to provide a cassette type recording and reproducing apparatus wherein slipping of the tape cassette on the cassette stage during loading of the tape cassette is prevented and during ejecting the tape cassette can be smoothly and certainly ejected through a fixed distance.

A fourth object of the invention is to provide a cassette type recording and reproducing apparatus which can press selectively on tape cassettes of a plurality of types in positions in the vicinities of their reel centers without using a complicated mechanism for pulling the tape cassette into the cassette stage forcibly.

To achieve the above-mentioned objects and other objects, a first aspect of the invention provides a cassette type recording and reproducing apparatus comprising tape cassettes of a plurality of types whose sizes differ, a front panel provided with a cassette insertion opening, a cassette stage reciprocated between a cassette insertion position where the tape cassettes of a plurality of types are selectively inserted into the cassette stage through the cassette insertion opening and a cassette loading position where recording and reproducing are carried out on the tape cassettes, a pivoting cassette insertion guide disposed in a position in the vicinity of an inner side of the cassette insertion opening for determining an insertion position to which a small tape cassette is inserted into the cassette stage, and a pivoting cassette discriminating member disposed on the inner side of the cassette insertion opening on a cassette ejection direction side of the cassette insertion guide and caused by a large tape cassette to pivot in a cassette insertion direction and remove the cassette insertion guide to outside a cassette insertion space, wherein an operating stroke through which the cassette discriminating member moves to remove the cassette insertion guide to outside the cassette insertion space is small and the cassette discriminating member and the cassette insertion guide are arranged overlapping in the cassette insertion and ejection directions.

A second aspect of the invention provides a cassette type recording and reproducing apparatus according to this first aspect of the invention further comprising first urging means for urging the cassette insertion guide to pivot in a direction removing it from inside the cassette insertion space to outside the cassette insertion space, and second urging means for urging the cassette discriminating member to pivot in the cassette ejection direction, wherein when the cassette discriminating member is caused by a large tape cassette to pivot in the cassette insertion direction against resistance of the second urging means the cassette insertion guide is removed to outside the cassette insertion space by the first urging means.

A third aspect of the invention provides a cassette type recording and reproducing apparatus according to the first aspect of the invention wherein the cassette insertion guide is disposed oriented in a direction perpendicular to the cassette insertion direction, small tape cassette insertion guide surfaces are formed on the cassette insertion guide on both sides of a central part thereof, cassette stopper surfaces for preventing mis-insertion of a small tape cassette are formed on the cassette insertion guide on outer sides of the small tape cassette insertion guide surfaces, and a cassette discriminating member is disposed at each end of the cassette insertion opening.

A fourth aspect of the invention provides a cassette type recording and reproducing apparatus according to the first aspect of the invention wherein a cassette discriminating part of the cassette discriminating member is inserted into the cassette insertion opening.

A fifth aspect of the invention provides a cassette type recording and reproducing apparatus comprising tape cassettes of a plurality of types whose sizes and thicknesses differ, a cassette stage reciprocated between a cassette insertion position where the tape cassettes of a plurality of types are selectively inserted into the cassette stage and a cassette loading position where recording and reproducing are carried out on the tape cassettes, a cassette ejecting mechanism mounted on the cassette stage for when the cassette stage is ejected from the cassette loading position to the cassette insertion position ejecting the tape cassettes from the cassette stage in a cassette ejection direction, and ejection stroke switching means for using a difference in the thicknesses of the tape cassettes of a plurality of types so switching an ejection stroke through which the tape cassettes are ejected from the cassette stage by the cassette ejecting mechanism that a small tape cassette is ejected through a large ejection stroke and a large tape cassette is ejected through a small ejection stroke.

A sixth aspect of the invention provides a cassette type recording and reproducing apparatus comprising tape cassettes of a plurality of types whose sizes and thicknesses differ, a cassette stage reciprocated between a cassette insertion position where the tape cassettes of a plurality of types are selectively inserted into the cassette stage and a cassette loading position where recording and reproducing are carried out on the tape cassettes, a slide member mounted in a fixed position, a following lever attached to the cassette stage an amount of overlap with respect to the slide member of which following lever is changed in correspondence with a difference in the thicknesses of the tape cassettes of a plurality of types, and a cassette ejecting lever attached to the cassette stage and driven by the following lever to pivot and eject the tape cassette from the cassette stage in a cassette ejection direction, wherein when the cassette stage is ejected from the cassette loading position to the cassette insertion position the following lever is caused to pivot by the slide member and the cassette ejecting lever ejects the tape cassette from the cassette stage in the cassette ejection direction and when the tape cassette is ejected from the cassette stage an amount by which the cassette ejecting lever is driven by the following lever is so changed in correspondence with the amount of overlap that a small tape cassette is ejected through a large ejection stroke and a large tape cassette is ejected through a small ejection stroke.

A seventh aspect of the invention provides a cassette type recording and reproducing apparatus according to the this sixth aspect of the invention wherein the slide member is a cam of which a face making contact with the following lever has a sloping surface sloping downward in a cassette insertion direction.

An eighth aspect of the invention provides a cassette type recording and reproducing apparatus according to the sixth aspect of the invention wherein the slide member is a roller having a circumferential face making contact with the following lever.

A ninth aspect of the invention provides a cassette type recording and reproducing apparatus comprising a front panel provided with a cassette insertion opening, a cassette stage reciprocated between a cassette insertion position where a tape cassette is inserted into the cassette stage through the cassette insertion opening and a cassette loading position where recording and reproducing are carried out on the tape cassette, cassette pressing means mounted on the cassette stage for pressing the tape cassette, a cassette ejecting mechanism mounted on the cassette stage for when the cassette stage is ejected from the cassette loading position to the cassette insertion position ejecting the tape cassette from the cassette stage in a cassette ejection direction, and pressing force changing means for increasing a cassette pressing force exerted by the cassette pressing means when the cassette stage is loaded from the cassette insertion position to the cassette loading position and decreasing the cassette pressing force exerted by the cassette pressing means when the cassette stage is ejected from the cassette loading position to the cassette insertion position.

A tenth aspect of the invention provides a cassette type recording and reproducing apparatus according to this ninth aspect of the invention wherein the cassette pressing means comprises a cassette pressing lever pivotally attached to the cassette stage, the cassette ejecting mechanism comprises a slide member mounted in a fixed position, a following lever pivotally attached to the cassette pressing lever and relatively driven to pivot by the slide member, and a cassette ejecting lever pivotally attached to the cassette stage and driven to pivot by the following lever, and the pressing force changing means comprises the following lever and a sloping surface formed on the slide member.

An eleventh aspect of the invention provides a cassette type recording and reproducing apparatus according to the ninth aspect of the invention further comprising a cassette ejection stopper mounted on the cassette stage for stopping the cassette ejecting lever in a fixed position in the cassette ejection direction.

A twelfth aspect of the invention provides a cassette type recording and reproducing apparatus according to this tenth aspect of the invention wherein the slide member is a cam of which a face making contact with the following lever having a sloping surface sloping downward in a cassette insertion direction.

A thirteenth aspect of the invention provides a cassette type recording and reproducing apparatus according to the tenth aspect of the invention wherein the slide member is a roller having a circumferential face making contact with the following lever.

A fourteenth aspect of the invention provides a cassette type recording and reproducing apparatus comprising a front panel provided with a cassette insertion opening, a cassette stage reciprocated between a cassette insertion position where a tape cassette is inserted into the cassette stage through the cassette insertion opening and a cassette loading position where recording and reproducing are carried out on the tape cassette, an opening and closing cover attached to the cassette stage and closing the cassette insertion opening from an inner side thereof when the cassette stage is in the cassette insertion position and opened by the tape cassette as the tape cassette is inserted into the cassette stage through the cassette insertion opening, urging means for urging the opening and closing cover to pivot closed, and a cassette pressing part provided on the opening and closing cover for pressing the tape cassette.

A fifteenth aspect of the invention provides a cassette type recording and reproducing apparatus comprising a front panel provided with a cassette insertion opening, a cassette stage reciprocated between a cassette insertion position where a tape cassette is inserted into the cassette stage through the cassette insertion opening and a cassette loading position where recording and reproducing are carried out on the tape cassette, a cassette pressing lever pivotally attached to the cassette stage, an opening and closing cover of inwardly opening type pivotally attached to the cassette pressing lever and closing the cassette insertion opening from an inner side thereof when the cassette stage is in the cassette insertion position and opened by the tape cassette as the tape cassette is inserted into the cassette stage through the cassette insertion opening, urging means for urging the cassette pressing lever to pivot in a cassette pressing direction, urging means for urging the opening and closing cover to close, and a cassette pressing part provided on the opening and closing cover for pressing the tape cassette inserted into the cassette stage.

A sixteenth aspect of the invention provides a cassette type recording and reproducing apparatus according to this fifteenth aspect of the invention further comprising a stopper mounted on the cassette stage for limiting pivoting of the cassette pressing lever in the cassette pressing direction.

A seventeenth aspect of the invention provides a cassette type recording and reproducing apparatus comprising tape cassettes of a plurality of types whose sizes differ, a cassette stage reciprocated between a cassette insertion position where the tape cassettes of a plurality of types are selectively inserted into the cassette stage and a cassette loading position where recording and reproducing are carried out on the tape cassettes, and cassette pressing parts of a plurality of types attached to the cassette stage for selectively pressing the tape cassettes of a plurality of types selectively inserted into the cassette stage in positions in the vicinities of reel centers thereof.

An eighteenth aspect of the invention provides a cassette type recording and reproducing apparatus comprising tape cassettes of a plurality of types whose sizes differ, a cassette stage reciprocated between a cassette insertion position where the tape cassettes of a plurality of types are selectively inserted into the cassette stage and a cassette loading position where recording and reproducing are carried out on the tape cassettes, a pressing member attached to the cassette stage, and cassette pressing parts of a plurality of types provided on the pressing member for selectively pressing the tape cassettes of a plurality of types selectively inserted into the cassette stage in positions in the vicinities of reel centers thereof.

A nineteenth aspect of the invention provides a cassette type recording and reproducing apparatus according to this eighteenth aspect of the invention further comprising a front panel provided with a cassette insertion opening, wherein the pressing member doubles as an opening and closing cover for opening and closing the cassette insertion opening from an inner side thereof.

BRIEF DESCRIPTION OF THE DRAWINGS

FIG. 20 is a partially sectional side view illustrating lock and lock release operations of the cassette discriminating members carried out by lock levers.

DETAILED DESCRIPTION OF THE PREFERRED EMBODIMENTS

A cassette type recording and reproducing apparatus which is a preferred embodiment of the invention applied to a video cassette recorder or the like will now be described with reference to FIG. 2A through FIG. 20. Constituent parts the same as parts shown in FIGS. 1A through 1D have been given the same symbols as their counterparts in those figures.

Description of Main Points of Invention

First, main points of the invention will be explained on the basis of FIGS. 2A through 2H.

Figure 2A:
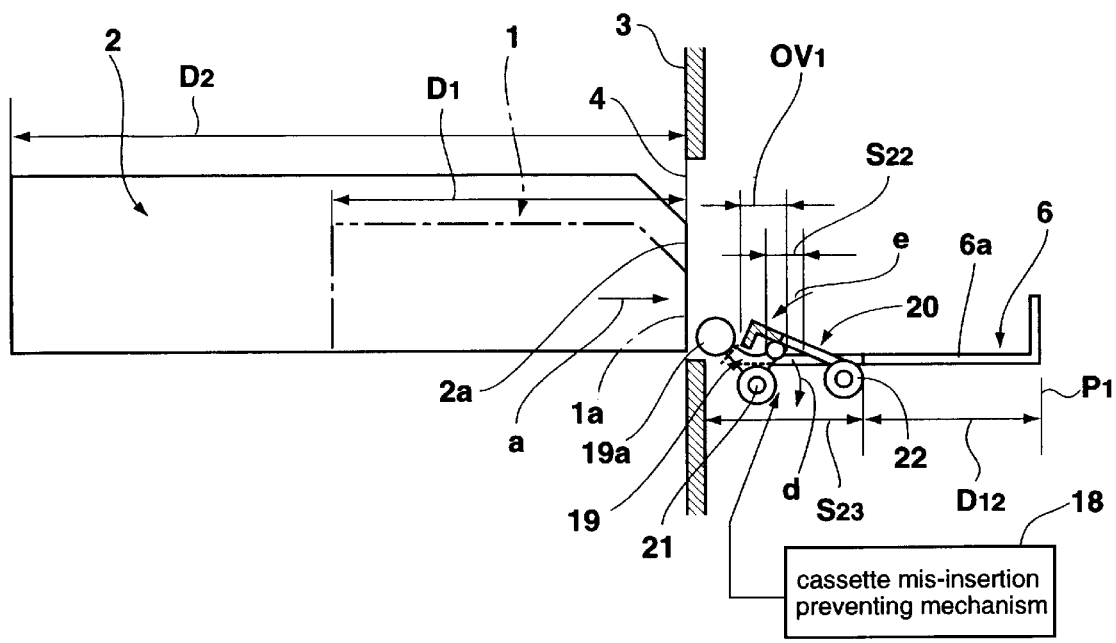
FIGS. 2A through 2H are schematic views illustrating main features of the invention in a preferred embodiment of the invention applied to a cassette type recording and reproducing apparatus.

A cassette type recording and reproducing apparatus of the invention, as shown in FIG. 2A, has a cassette mis-insertion preventing mechanism 18 for discriminating the type (size) of small and large tape cassettes 1, 2 and preventing mis-insertion of a small tape cassette 1 into a cassette stage 6. This cassette mis-insertion preventing mechanism 18 has pivoting cassette discriminating members 19 and a cassette insertion guide 20, and these are mounted pivotally on horizontal support pins 21, 22 respectively. The cassette insertion guide 20 is disposed extending in a direction perpendicular to a cassette insertion direction (the arrow a direction) in a position in the vicinity of the inner side of a cassette insertion opening 4, and a left-right pair of the cassette discriminating members 19 are disposed in positions at the left and right ends of the cassette insertion guide 20 and between the cassette insertion guide 20 and the cassette insertion opening 4. A left-right pair of cassette discriminating parts 19a positioned at the cassette ejection direction (the arrow a' direction) extremities of the cassette discriminating members 19 are inserted in the arrow a' direction into the left and right ends of the cassette insertion opening 4.

By an operating stroke $S_{22}$ through which the cassette discriminating members 19 move to remove the cassette insertion guide 20 to outside the cassette insertion space being made small and these cassette discriminating members 19 and the cassette insertion guide 20 being disposed with an overlap $OV_1$ in the cassette insertion and ejection directions (the arrow a, a' directions), the space $S_{14}$ in the cassette insertion direction occupied by this cassette mis-insertion preventing mechanism 18 is made small. As a result, when the cassette stage 6 is returned to the cassette insertion position $P_1$ it is possible to bring the cassette stage 6 amply close to the front panel 3 and furthermore it is possible to make the cassette insertion direction (the arrow a direction) depth $D_{12}$ of a bottom plate 6a of the cassette stage 6 amply large.

This cassette mis-insertion preventing mechanism 18 is constructed so that when as shown with solid lines in FIG. 2A a large tape cassette 2 is horizontally inserted in the arrow a direction into the cassette stage 6 through the cassette insertion opening 4 the left and right ends of the front cover 2A side of that large tape cassette 2 abut with the cassette discriminating parts 19a of the left-right pair of cassette discriminating members 19 and these cassette discriminating members 19 are pivoted in the arrow d direction about the support pins 21 against the resistance of urging means which will be further discussed later and the cassette insertion guide 20 is pivoted and removed in the arrow e direction by other urging means which will be further discussed later about the support pins 22 from a position above the bottom plate 6a of the cassette stage 6, which is inside the cassette insertion space, to a position below the bottom plate 6a of the cassette stage 6, which is below the cassette insertion space. On the other hand, when as shown with broken lines in FIG. 2A a small tape cassette 1 is horizontally inserted in the arrow a direction into the cassette stage 6 through the cassette insertion opening 4, that small tape cassette 1 is guided by the cassette insertion guide 20 to the center of the cassette stage 6 and the small tape cassette 1 being mis-inserted to an off-center position to the right or the left of the center of the cassette stage 6 is prevented by the cassette insertion guide 20.

Figure 2B:
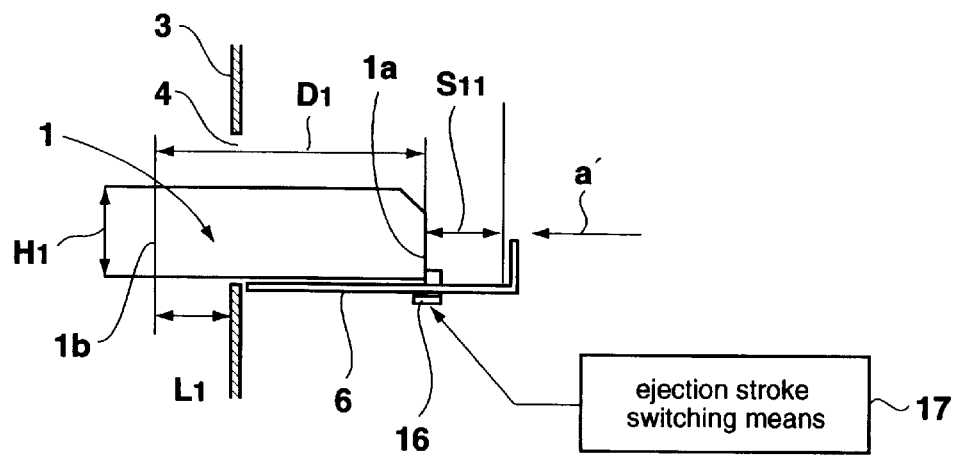
Figure 2C:
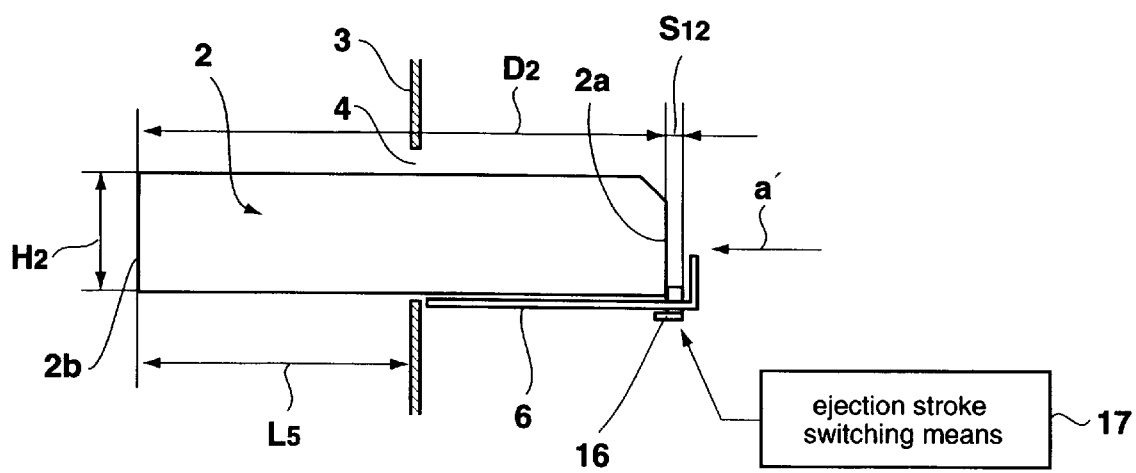

As shown in FIG. 2B and FIG. 2C, a cassette type recording and reproducing apparatus of the invention also has a cassette ejecting mechanism 16 for ejecting tape cassettes 1, 2 of two types whose front-rear depths $D_1$, $D_2$ and thicknesses $H_1$, $H_2$ differ using the same cassette ejecting levers 8, which are cassette ejecting means, and ejection stroke switching means 17 for switching the cassette ejection stroke of the cassette ejecting levers 8 by utilizing the difference in the thicknesses $H_1$, $H_2$ of these tape cassettes 1, 2.

As shown in FIG. 2B, when a small tape cassette 1 whose thickness $H_1$ is small is being ejected, the ejection stroke $S_{11}$ through which the cassette ejecting levers 8 eject the small tape cassette 1 from the cassette stage 6 in the arrow a' direction is made large, and the distance $L_1$ by which the rear end 1b of the small tape cassette 1 projects to outside the front panel 3 when at the point in time at which the cassette stage 6 returns to the cassette insertion position $P_1$ the ejection is completed is thereby made large so that thereafter the rear end 1b of the tape cassette 1 can be easily gripped by hand and taken out of the apparatus.

Figure 1A:
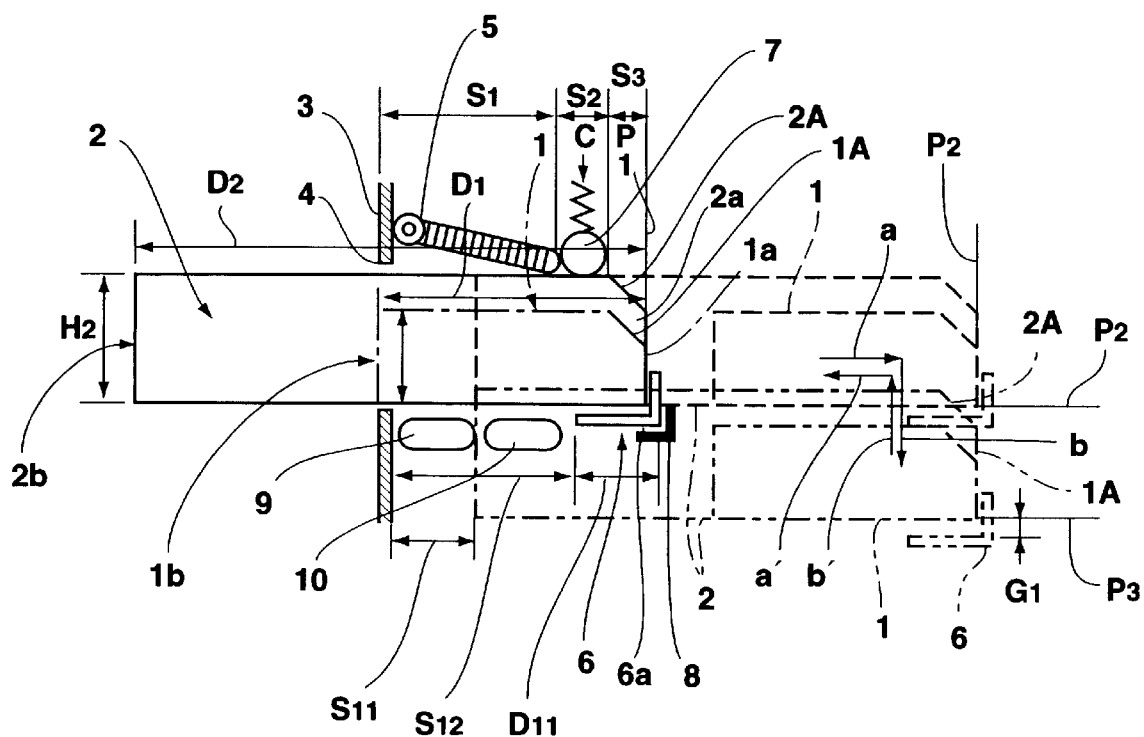
FIGS. 1A through 1D are schematic views illustrating problems associated with cassette type recording and reproducing apparatuses of the related art.
Figure 1B:
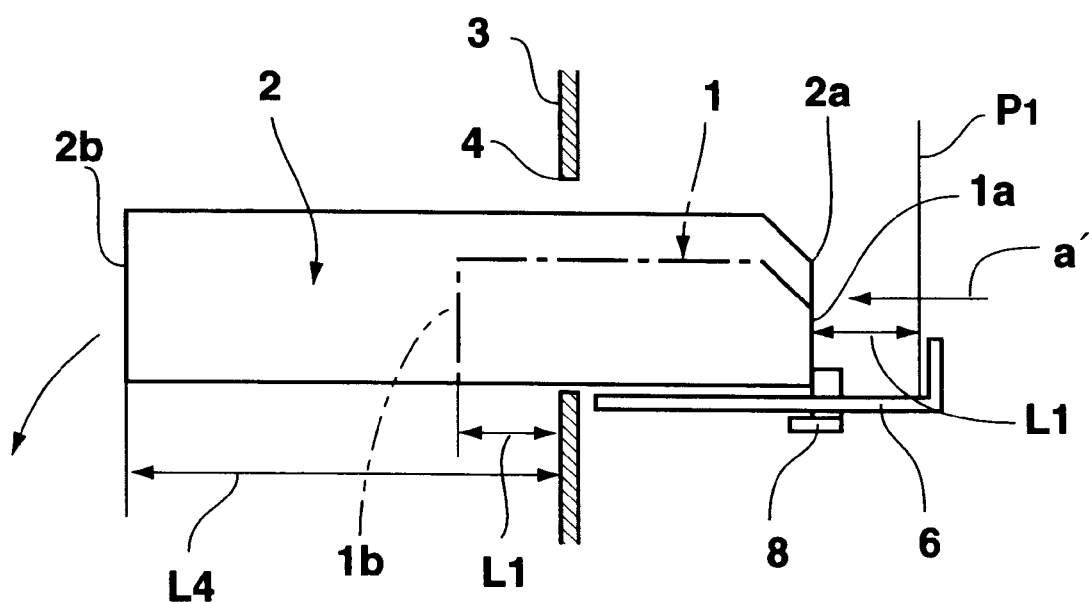
Figure 1C:
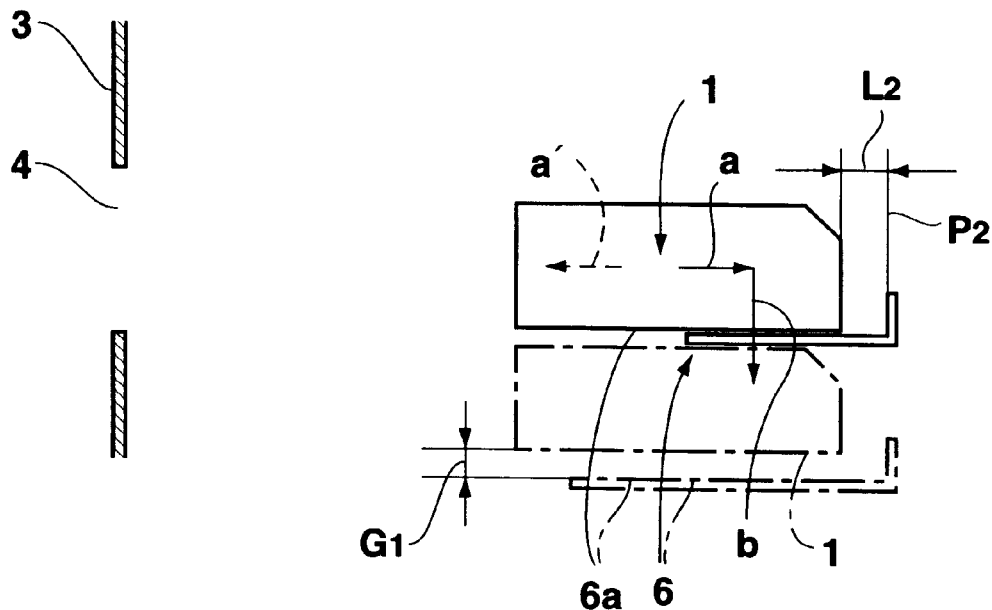
Figure 1D:
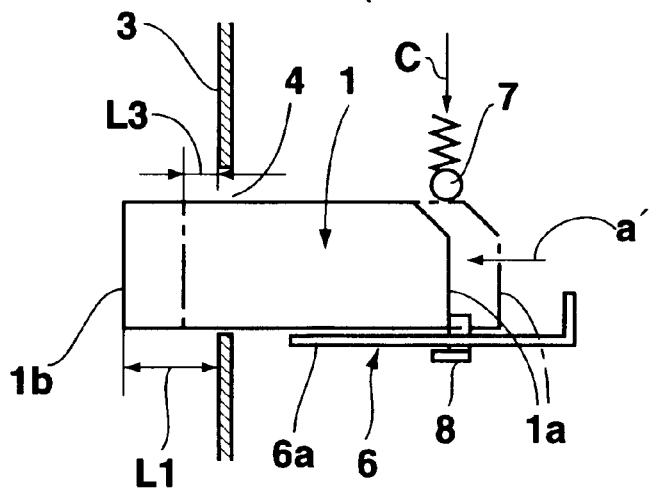

On the other hand, as shown in FIG. 2C, when a large tape cassette 2 whose thickness $H_2$ is large is being ejected, the ejection stroke $S_{12}$ through which the cassette ejecting levers 8 eject the large tape cassette 2 from the cassette stage 6 in the arrow a' direction is made small, and the distance $L_5$ by which the rear end 2b of the large tape cassette 2 projects to outside the front panel 3 when at the point in time at which the cassette stage 6 returns to the cassette insertion position $P_1$ the ejection is completed is amply small compared to the projecting distance $L_4$ of the related art example shown in FIG. 1B so that this projecting distance $L_5$ is not excessive.

Figure 2D:
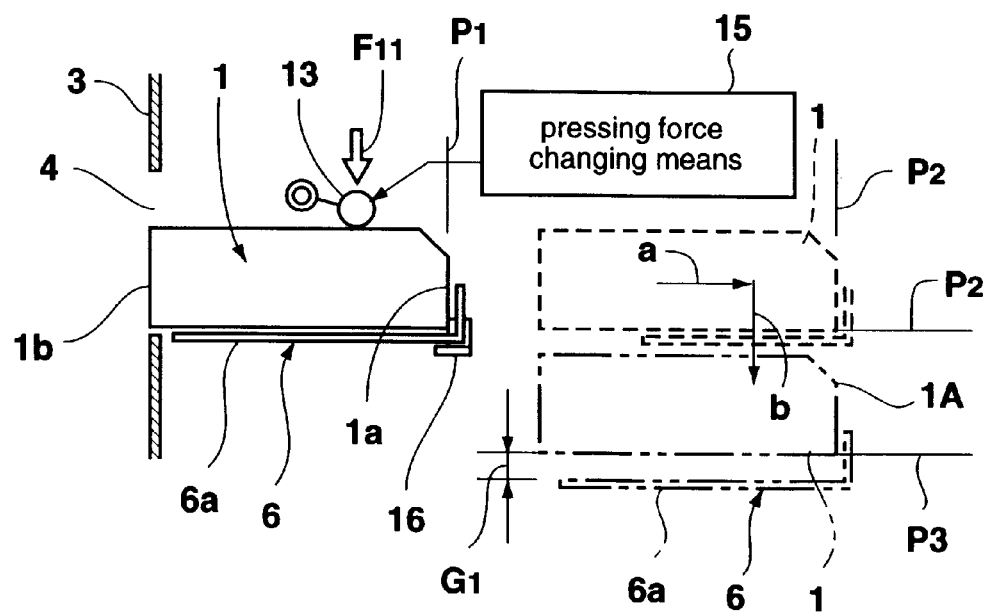
Figure 2E:
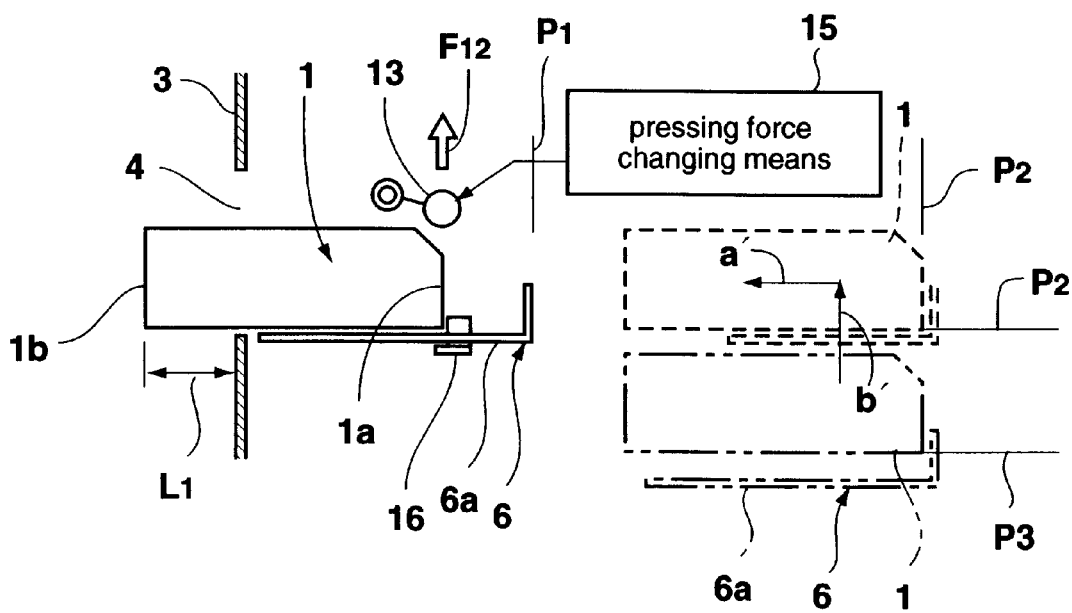
Figure 2F:
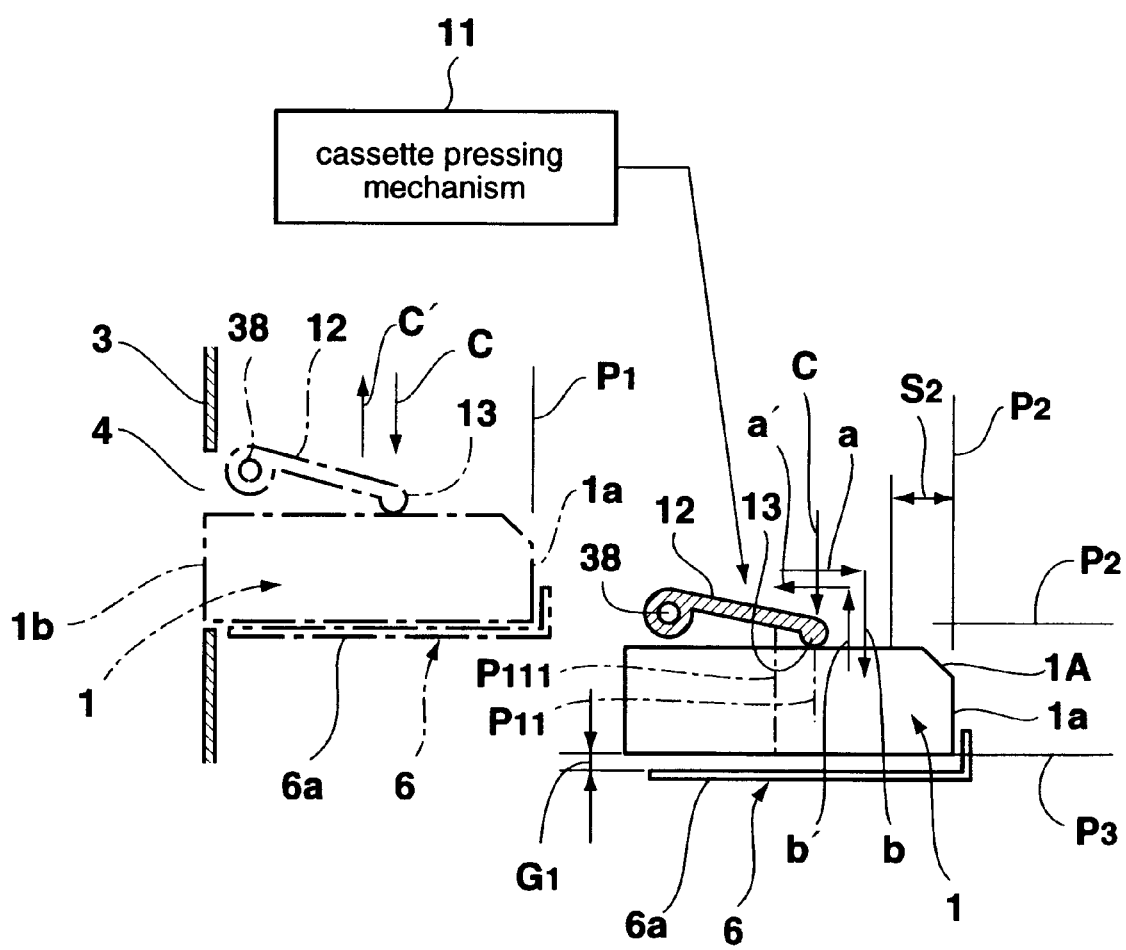

Also, as shown in FIGS. 2D, 2E and 2F, a cassette type recording and reproducing apparatus of the invention has pressing force changing means 15 for changing over the cassette pressing force of the cassette pressing mechanism 11 between a strong cassette pressing force $F_1$ and a weak cassette pressing force $F_2$.

That is, as shown in FIG. 2D, during cassette loading, when a tape cassette 1 has been inserted horizontally through the cassette insertion opening 4 in the front panel 3 into the cassette stage 6 in the arrow a direction, the tape cassette 1 is strongly pressed onto the bottom plate 6a of the cassette stage 6 by the cassette pressing mechanism 11 already set to a strong cassette pressing force $F_1$. As a result, when the cassette stage 6 is loaded from the cassette insertion position $P_1$ via the cassette pulling in position $P_2$ to the cassette loading position $P_3$, slipping out of position of the tape cassette 1 on the cassette stage 6 is prevented and the tape cassette 1 is correctly and firmly loaded into the cassette loading position $P_3$.

As shown in FIG. 2E, during cassette ejecting, in the course of ejecting the cassette stage 6 from the cassette loading position $P_3$ via the cassette pulling in position $P_2$ to the cassette insertion position $P_1$, the cassette pressing force of the cassette pressing mechanism 11 is changed over by the pressing force changing means 15 to the weak cassette pressing force $F_2$, and the tape cassette 1 is smoothly and certainly ejected from the cassette stage 6 in the arrow a' direction through the fixed distance $L_1$ by the cassette ejecting mechanism 16, and the rear end 1b of the tape cassette 1 is certainly and stably made to project to outside the front panel 3 by the fixed distance $L_1$ when the cassette stage 6 returns to the cassette insertion position $P_1$.

Also, as shown in FIG. 2F, a cassette type recording and reproducing apparatus of the invention has a cassette pressing mechanism 11 utilizing an opening and closing cover and comprising an opening and closing cover 12, which opens and closes the cassette insertion opening 4 in the front panel 3 from the inner side thereof and is pivotally attached to the cassette stage 6 itself, and cassette pressing parts 13 provided on the opening and closing cover 12.

When the tape cassette 1 is inserted horizontally into the cassette stage 6 in the arrow a direction through the cassette insertion opening 4, the tape cassette 1 pushes open the opening and closing cover 12 in the arrow c' direction and by a reaction force exerted in the arrow c direction by a pressing spring, which will be further discussed later, the cassette pressing parts 13 of the opening and closing cover 12 press the tape cassette 1 onto the bottom plate 6a of the cassette stage 6 in an optimum position $P_{111}$ in the vicinity of the reel centers $P_{11}$ of the tape cassette 1 behind a space $S_2$ through which the front cover 1A of the tape cassette 1 moves.

After this cassette insertion, when the cassette stage 6 is loaded from the cassette insertion position $P_1$ via the cassette pulling in position $P_2$ to the cassette loading position $P_3$ in the arrow a and b directions and the tape cassette 1 is loaded into the cassette loading position $P_3$ in the arrow b direction, the opening and closing cover 12 moves integrally with the cassette stage 6 in the arrow a, b directions and the reel center $P_{11}$ vicinity position $P_{111}$ of the tape cassette 1 is strongly pressed in the arrow c direction by the cassette pressing parts 13 of the opening and closing cover 12 and the tape cassette 1 is thereby pressed into the cassette loading position $P_3$ in the arrow c direction with good stability.

Figure 2G:
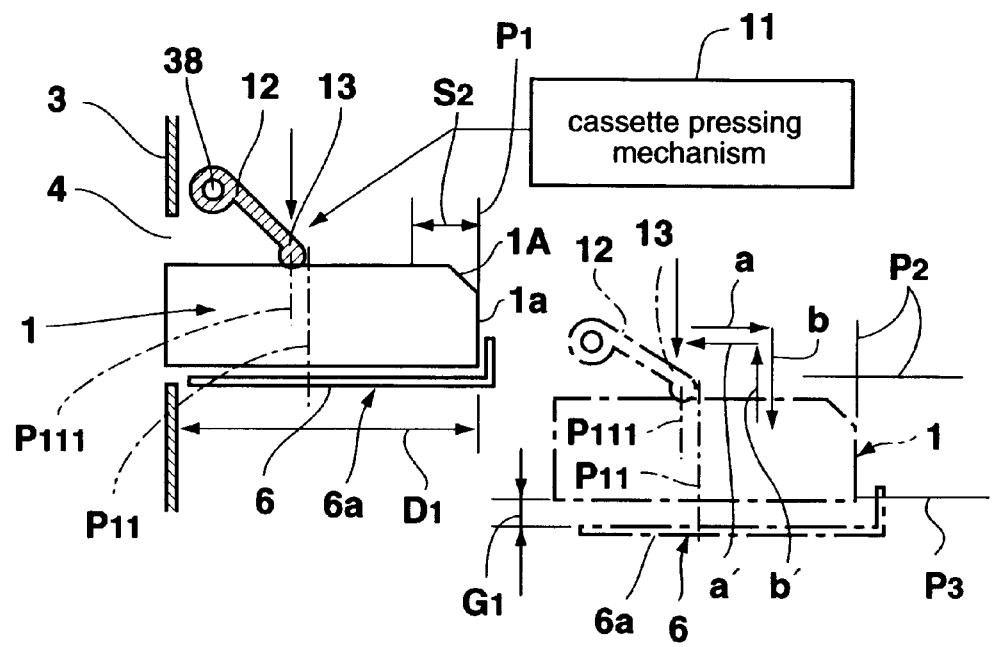
Figure 2H:
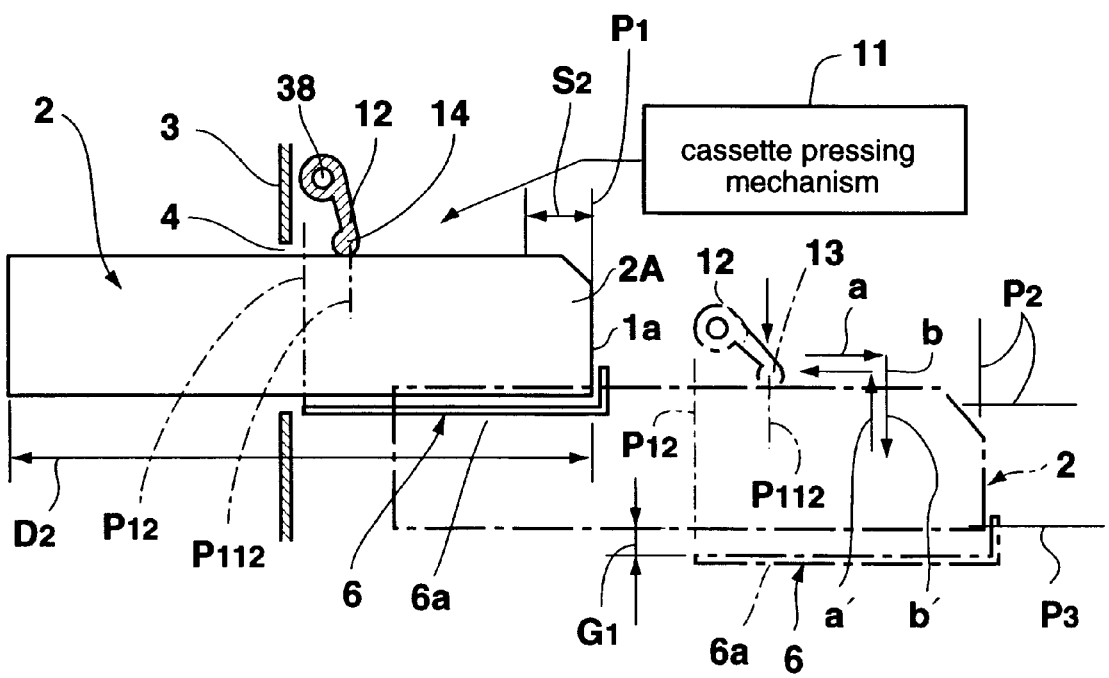

Also, as shown in FIGS. 2G and 2H, the cassette type recording and reproducing apparatus of the invention may have a cassette pressing mechanism 11 of a different type for pressing tape cassettes 1, 2 of each of two types whose sizes $D_1$, $D_2$ differ, wherein two types of cassette pressing parts 13, 14 are provided on the cassette stage 6.

When tape cassettes 1, 2 of two types whose sizes differ are selectively inserted horizontally into the cassette stage 6 through the cassette insertion opening 4 in the arrow a direction, the tape cassettes 1, 2 are pressed in the arrow c direction by the two types of cassette pressing parts 13, 14 and pressing springs which will be further discussed later in optimum positions $P_{111}$, $P_{112}$ in the vicinities of the reel centers $P_{11}$, $P_{12}$ behind the space $S_2$ through which their front covers 1A, 2A of the tape cassettes 1, 2 move and these tape cassettes 1, 2 are thereby pressed onto the bottom plate 6a of the cassette stage 6.

After this cassette insertion, when the cassette stage 6 has been loaded from the cassette insertion position $P_1$ via the cassette pulling in position $P_2$ to the cassette loading position $P_3$ in the arrow a and b directions, the reel center $P_{11}$, $P_{12}$ vicinity positions $P_{111}$, $P_{112}$ of the respective tape cassettes 1, 2 are pressed in the arrow c direction by the two types of cassette pressing parts 13, 14 and these tape cassettes 1, 2 are pressed into the cassette loading position $P_3$ in the arrow b direction optimally and with good stability.

Description of Construction of Preferred Embodiment of Invention

Next, on the basis of FIG. 3 through FIG. 20, the construction of a preferred embodiment of the invention will be described.

Description of Two Types of Tape Cassette

As shown in FIG. 3, FIG. 4, FIG. 9, FIG. 11A, FIG. 11B, FIG. 12 and FIG. 13, tape cassettes 1, 2 of two types whose sizes (front-rear direction depth $D_1$, $D_2$ and left-right direction width $W_1$, $W_2$) and thicknesses $H_1$, $H_2$ differ contain magnetic tapes 33 wound on left-right pairs of tape reels 31, 32 whose diameters differ. These magnetic tapes 33 pass along the inner sides of front covers 1A, 2A of inner-outer double structure attached to front ends 1a, 2a of these tape cassettes 1, 2 and pivoted to open and close in the arrow f, f' directions.

Therefore, the reel centers $P_{11}$, $P_{12}$, which are substantially the positions in the front-rear direction (the arrow a, a' direction) of the centers of gravity of these tape cassettes 1, 2, are in positions different distances $L_{11}$, $L_{12}$ from these front ends 1a, 2a in correspondence with the difference in diameter between these tape reels 31, 32.

Description of Cassette Stage

Figure 3:
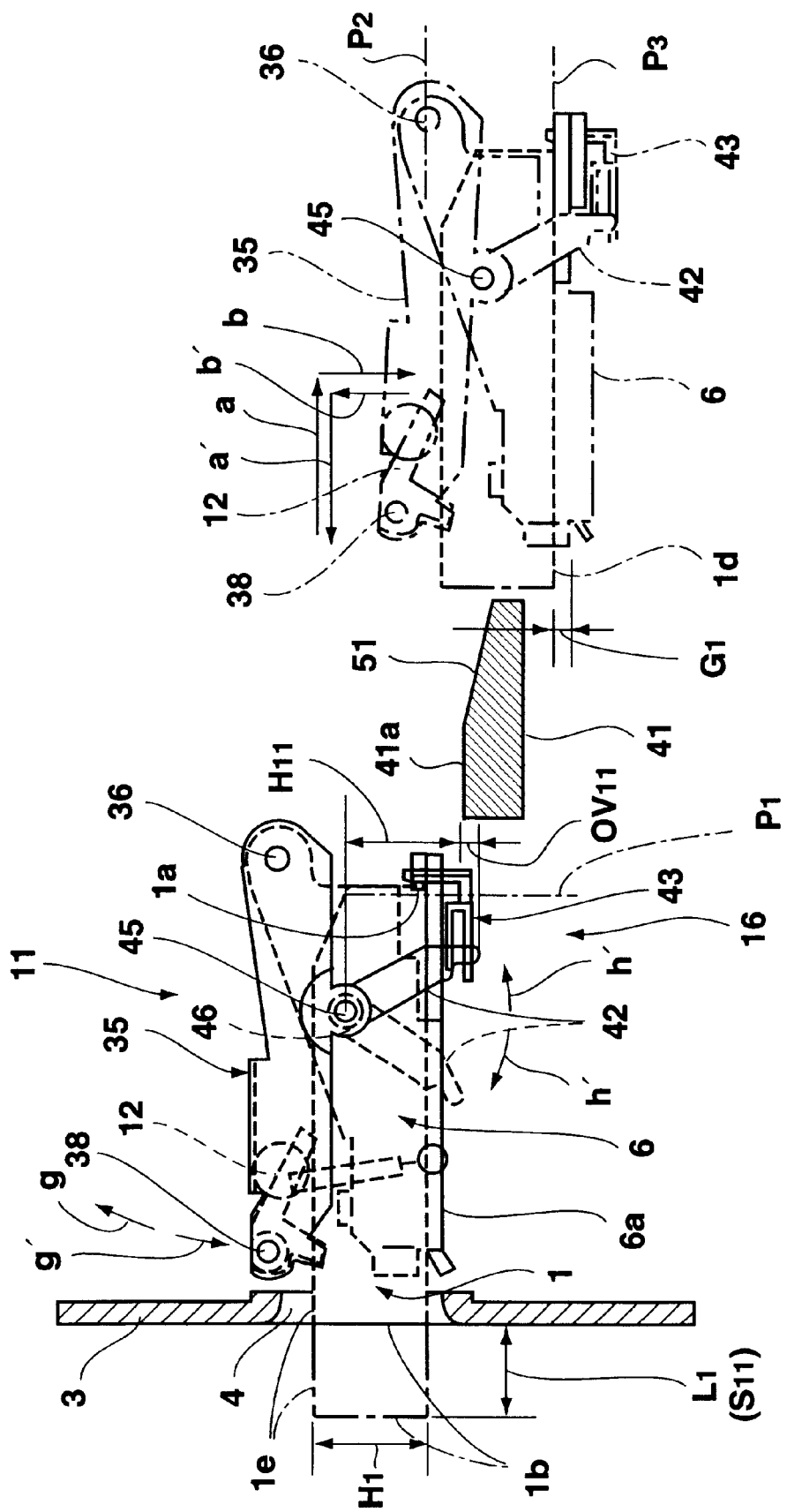
FIG. 3 is a partially sectional side view illustrating small tape cassette loading and ejecting operations of a cassette stage of the apparatus.
Figure 4:
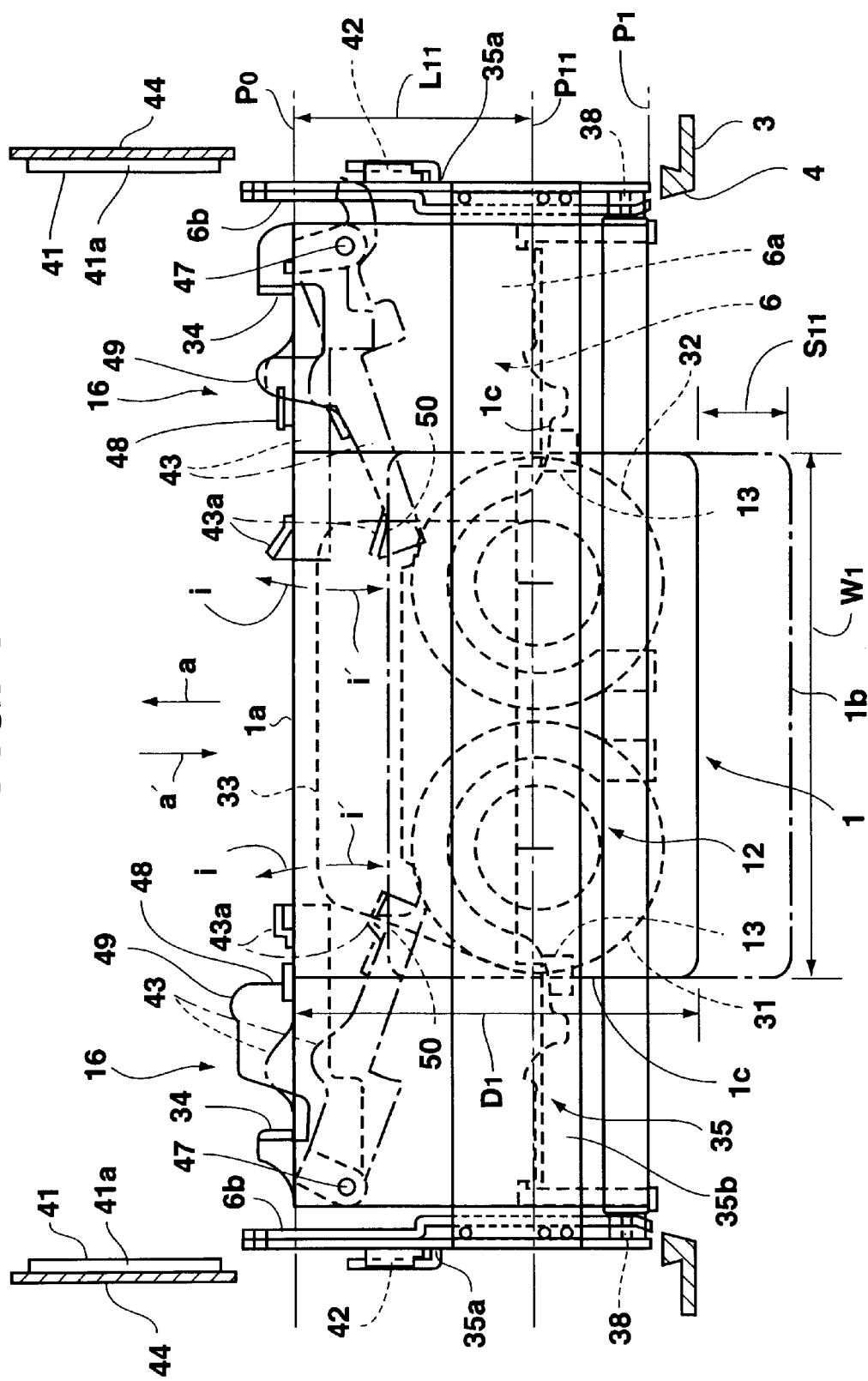
FIG. 4 is a partially sectional plan view of FIG. 3.
Figure 5:
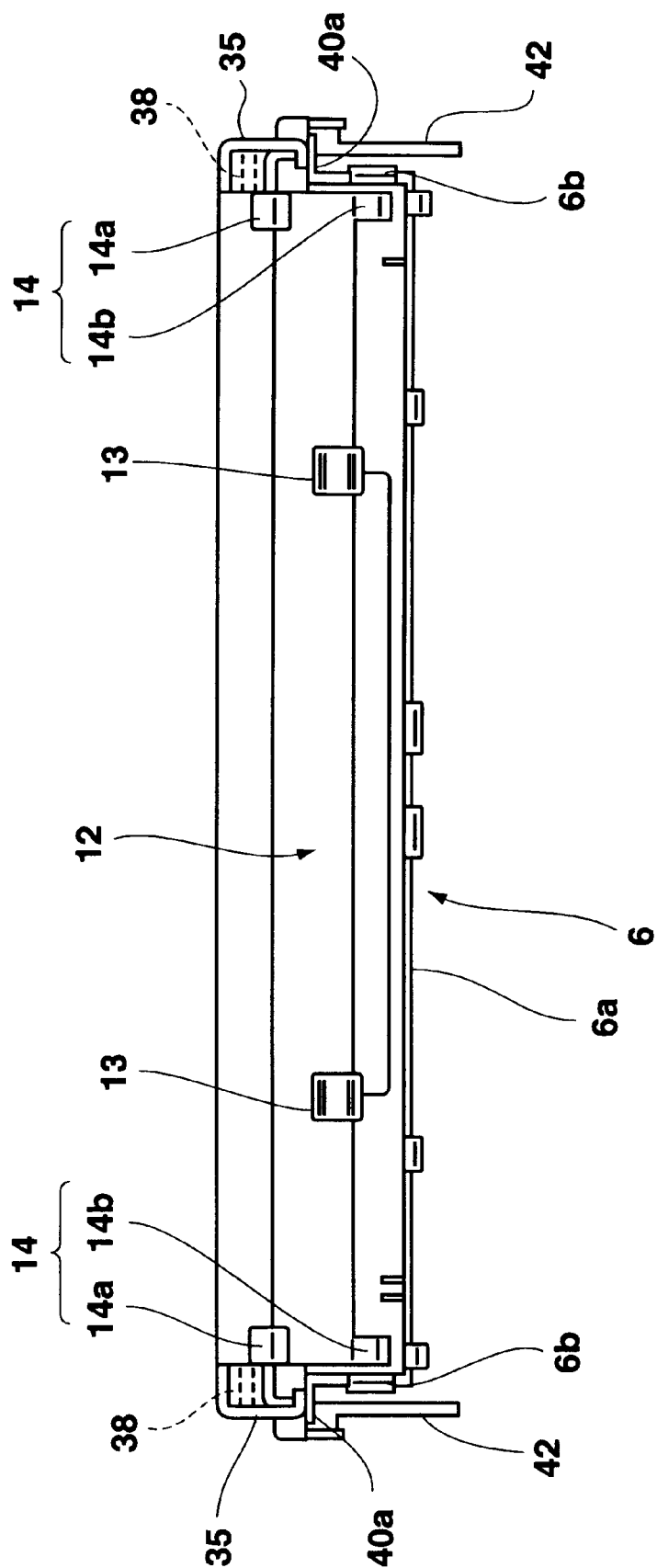
FIG. 5 is a front view of FIG. 4.
Figure 6:
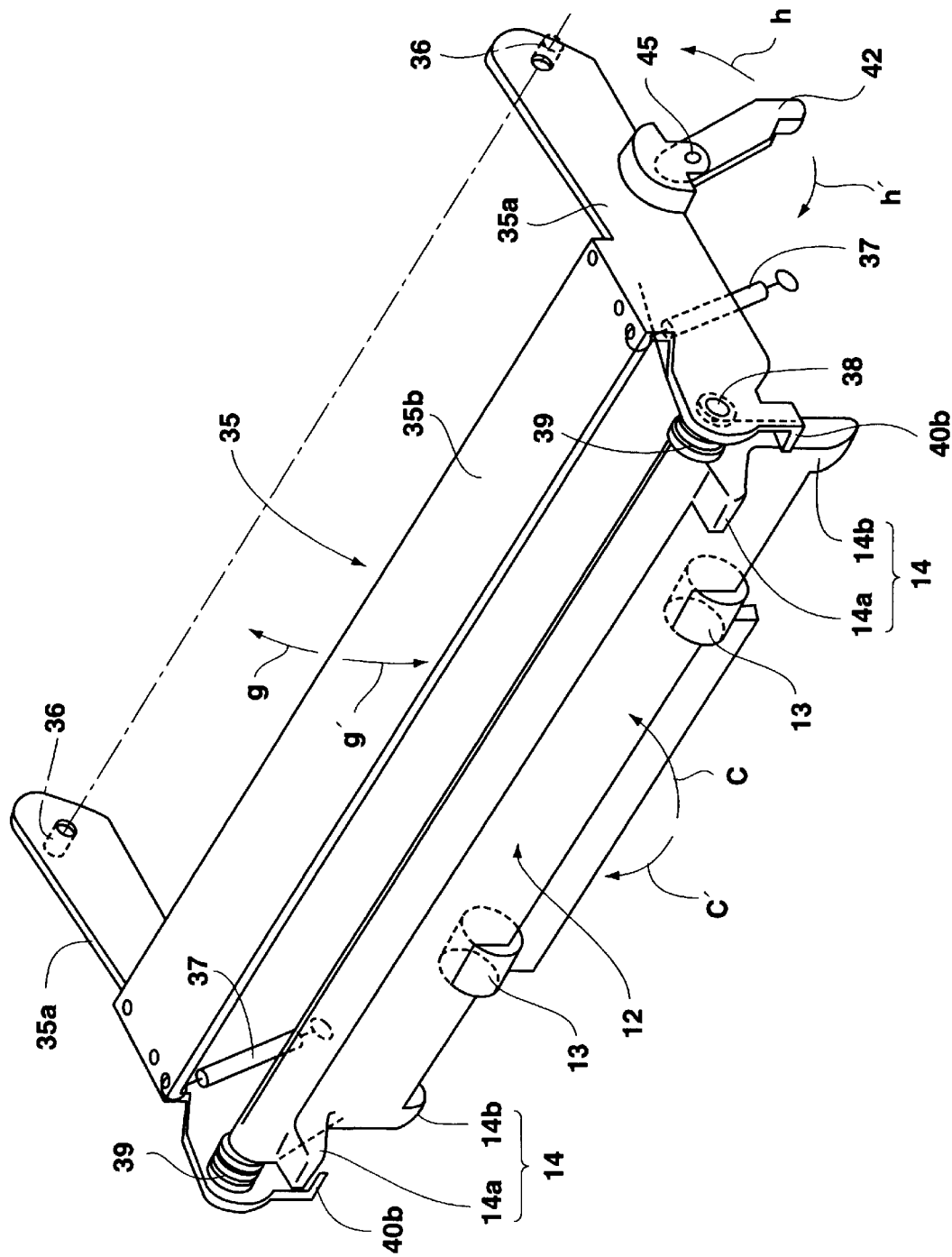
FIG. 6 is a perspective view showing an opening and closing cover, a pressing lever and a cam following lever of the apparatus.

As shown in FIG. 3 through FIG. 5, the cassette stage 6 is made of sheet metal or the like and its cross-sectional shape is an upward-facing approximate U-shape formed by the horizontal bottom plate 6a and a left-right pair of side plates 6b extending vertically upward from the left and right ends of the bottom plate 6a, and a left-right pair of cassette stoppers 34 for stopping a large tape cassette 2 are integrally formed with the left and right sides of the rear end (the arrow a direction side end) of the bottom plate 6a. Cassette stoppers (not shown) for a small tape cassette 1 similar to the cassette stopper 34 for a large tape cassette 2 are formed integrally with this bottom plate 6a.

As explained above with reference to FIGS. 1A through 1D, this cassette stage 6 is reciprocated by a loading mechanism in the arrow a, b directions and the arrow b', a' directions along a substantially L-shaped locus of movement between a cassette insertion position $P_1$ and a cassette loading position $P_3$ via a cassette pulling in position $P_2$.

Description of Cassette Pressing Mechanism

As shown in FIG. 3 through FIG. 6 and FIG. 8, a cassette pressing mechanism 11 is mounted on the cassette stage 6.

This cassette pressing mechanism 11 has an opening and closing cover 12 which opens and closes the cassette insertion opening 4 of the front panel 3 from the inner side thereof and a cassette pressing lever 35 which supports that opening and closing cover 12 and pivots up and down.

The cassette pressing lever 35 has its cross-sectional shape formed in a downward-facing approximate U-shape by a left-right pair of arm parts 35a and a crossbeam part 35b horizontally connecting upper parts of these. This cassette pressing lever 35 is mounted by the rear ends of these arm parts 35a pivotally in the arrow g, g' direction, which is an up-down direction, on the rear ends of the left-right pair of side plates 6b of the cassette stage 6 by way of a left-right pair of horizontal support pins 36. This cassette pressing lever 35 is urged to pivot in the arrow g' direction, which is a cassette pressing direction, by a left-right pair of pressing springs 37 which are rotational urging means consisting of tension coil springs, and is abutted with and stopped by a left-right pair of stoppers 40a formed integrally with the side plates 6b of the cassette stage 6.

The opening and closing cover 12 is molded out of synthetic resin or the like, and this opening and closing cover 12 has left and right sides of the upper end thereof attached pivotally in the arrow c, c' direction, which is a front-right and up-down direction, to the upper sides of the front ends of the left-right pair of arm parts 35a of the cassette pressing lever 35 by way of a left-right pair of horizontal support pins 38. This opening and closing cover 12 is urged to pivot in the arrow c' direction by a left-right pair of opening and closing cover springs 39 which are dual-purpose rotational urging means for cover-closing and for cassette-pressing consisting of torsion coil springs, and in a position shown in FIG. 8 in which it closes the cassette insertion opening 4 this opening and closing cover 12 is abutted with and stopped by stoppers 40b formed integrally with the left-right pair of arm parts 35a.

Description of Cassette Pressing Part

As shown in FIG. 5, FIG. 6, FIG. 9 and FIG. 13, the opening and closing cover 12 is constructed as a cassette pressing member, and a left-right pair of cassette pressing parts 13 for pressing a small tape cassette 1 are integrally formed at a spacing slightly smaller than the width $W_1$ of the small tape cassette 1 on the lower side of this opening and closing cover 12 on both sides of part substantially central in the left-right direction.

Also, a left-right pair of cassette pressing parts 14 for pressing a large tape cassette 2 are integrally formed on left and right end parts of this opening and closing cover 12. These cassette pressing parts 14 each have their cross-sectional shape formed in an approximate L-shape and each have an upper-lower pair of projections for cassette pressing 14a, 14b.

Thus, a structure wherein a left-right pair of cassette pressing parts 13 for a small tape cassette 1 and a left-right pair of cassette pressing parts 14 for a large tape cassette 2 are integrally formed on an opening and closing cover which is one cassette pressing member is provided.

Description of Cassette Ejecting Mechanism

As shown in FIG. 3 through FIG. 7 and FIG. 9 through FIG. 13, the cassette ejecting mechanism 16 is made up of a left-right pair of slide members 41 mounted in fixed positions, and a left-right pair of slide member following levers 42 and a left-right pair of cassette ejecting levers 43 attached to the cassette stage 6.

Figure 10A:
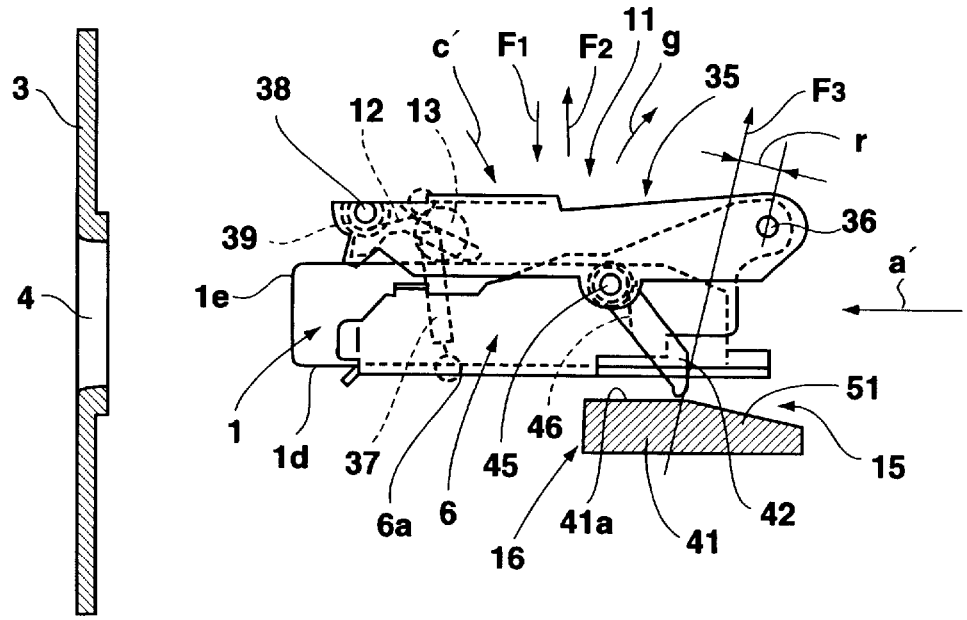
FIGS. 10A through 10D are partially sectional side views illustrating a cassette ejecting operation for ejecting a small tape cassette from the apparatus, FIGS. 10A and 10B showing an example wherein cams are used as slide members and FIGS. 10C and 10D showing an example wherein rollers are used as slide members.
Figure 10B:
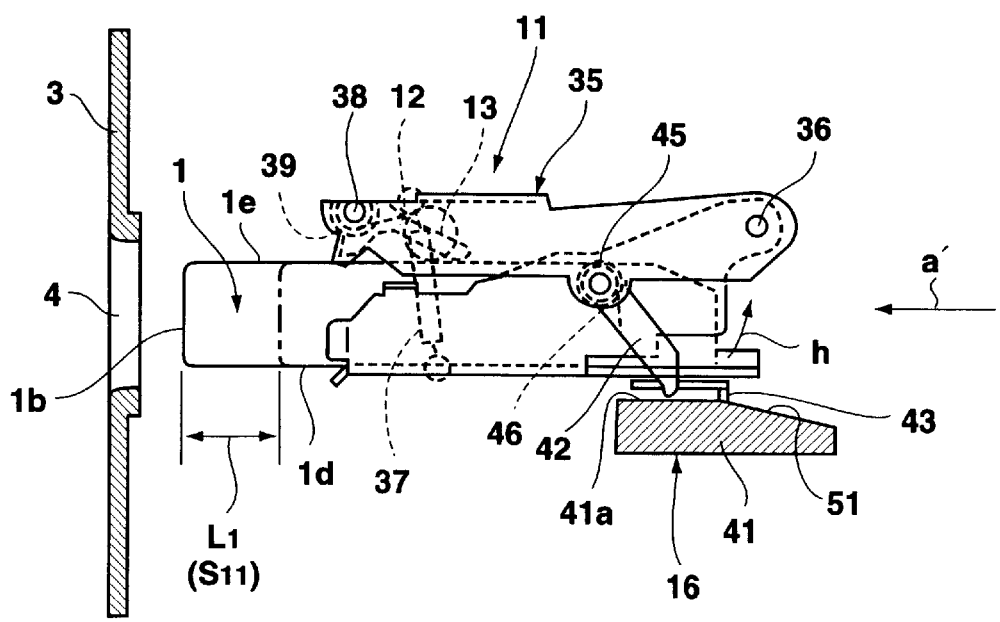
Figure 10C:
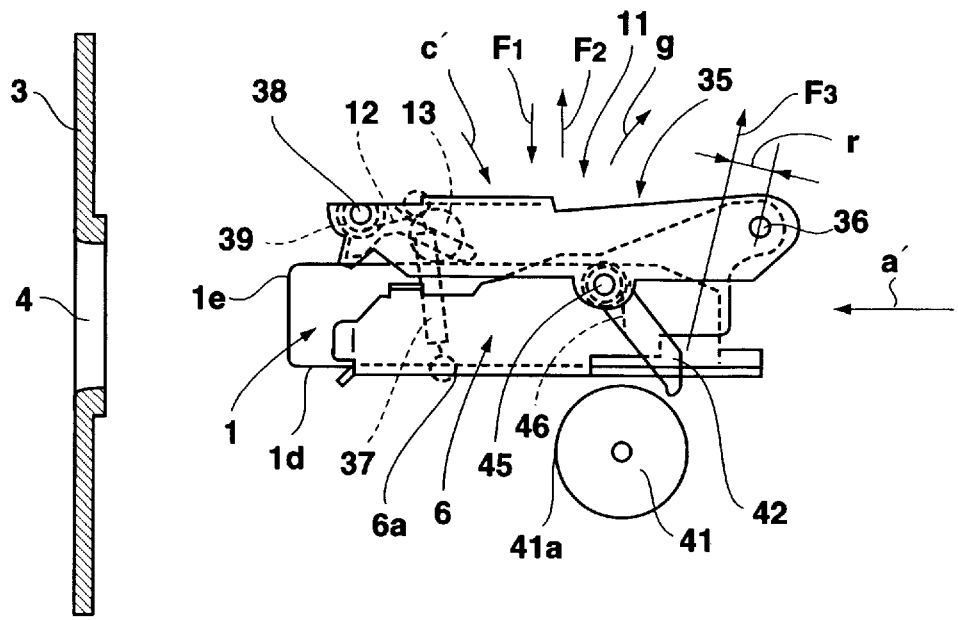
Figure 10D:
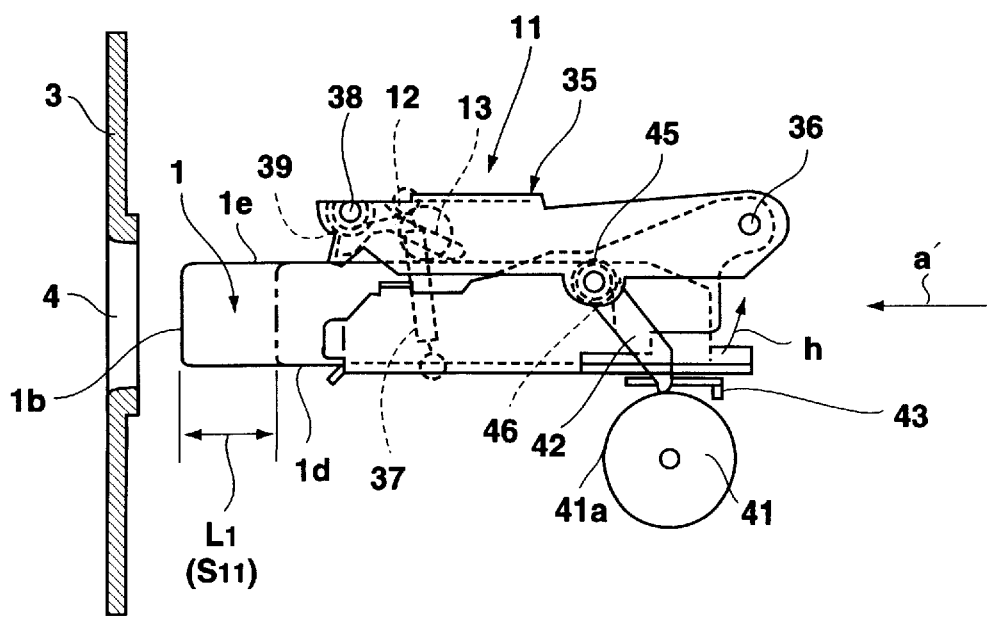

When as shown in FIGS. 10A and 10B the left-right pair of slide members 41 are cams, cam surfaces 41a are formed on their upper faces, and when as shown in FIGS. 10C and 10D the slide members 41 are rollers, these rollers are provided with roller surfaces 41a. The description of the slide members 41 given here applies to all slide members 41, in addition to those illustrated in FIGS. 10A through 10D.

The left-right pair of slide members 41 are made of synthetic resin or the like, and these slide members 41 are disposed on left and right sides of a substantially central position in the horizontal movement path in the arrow a, a' direction between the cassette insertion position $P_1$ and the cassette pulling in position $P_2$ of the cassette stage 6 described above with reference to FIGS. 1A through 1D and are fixed to inner sides of a left-right pair of chassis side plates 44.

The left-right pair of slide member following levers 42 are made of synthetic resin or the like, and these slide member following levers 42 are mounted by way of a left-right pair of horizontal support pins 45 pivotally in the arrow h, h' direction, which is a front-rear direction, in substantially central positions in the front-rear direction on the left-right pair of arm parts 35a of the cassette pressing lever 35 mounted on the cassette stage 6. These left-right pair of slide member following levers 42 hang downward from the support pins 45, and also these slide member following levers 42 are urged to pivot in the arrow h direction by a left-right pair of following lever springs 46 which are rotational urging means consisting of torsion coil springs.

The left-right pair of cassette ejecting levers 43 are formed out of sheet metal or the like substantially symmetrically, and these cassette ejecting levers 43 are mounted pivotally in the arrow i, i' direction, which is a front-rear direction, by way of vertical support pins 47 provided in left and right side positions on the underside of the rear end of the bottom plate 6a of the cassette stage 6. Cassette ejecting projections 43a extending vertically upward are integrally formed on inner ends of these cassette ejecting levers 42, and projections 42a integrally formed on the inner sides of the cam following levers 43 abut in the arrow h direction with projections 43b extending vertically upward from the outer side ends of these cassette ejecting levers 43.

Substantially L-shaped engaging arms 48 extending upward from between the support pins 47 and the cassette ejecting projections 43a of these cassette ejecting levers 43 are engaged with and moved in the arrow i, i' direction by a left-right pair of guide parts 49 formed on the bottom plate 6a of the cassette stage 6. A left-right pair of cassette ejection stoppers 50 which when the left-right pair of cassette ejecting projections 43a abut with them in the arrow i' direction stop the left-right pair of cassette ejecting levers 43 in an origin position in the arrow i direction are formed in positions on the inner sides of the guide parts 49 of this bottom plate 6a.

Description of Pressing Force Changing Means

As shown in FIG. 3 and FIG. 10A and 10B, the pressing force changing means 15 is made up of the slide member following levers 42 and the following lever springs 46 and sloping surfaces 51 formed on the cassette insertion direction sides (the arrow a direction sides) of the cam surfaces 41a, which are slide surfaces, of the left-right pair of cams 41, which are slide members. These sloping surfaces 51 are formed upwardly sloping in the cassette ejection direction (the arrow a' direction).

Figure 11A:
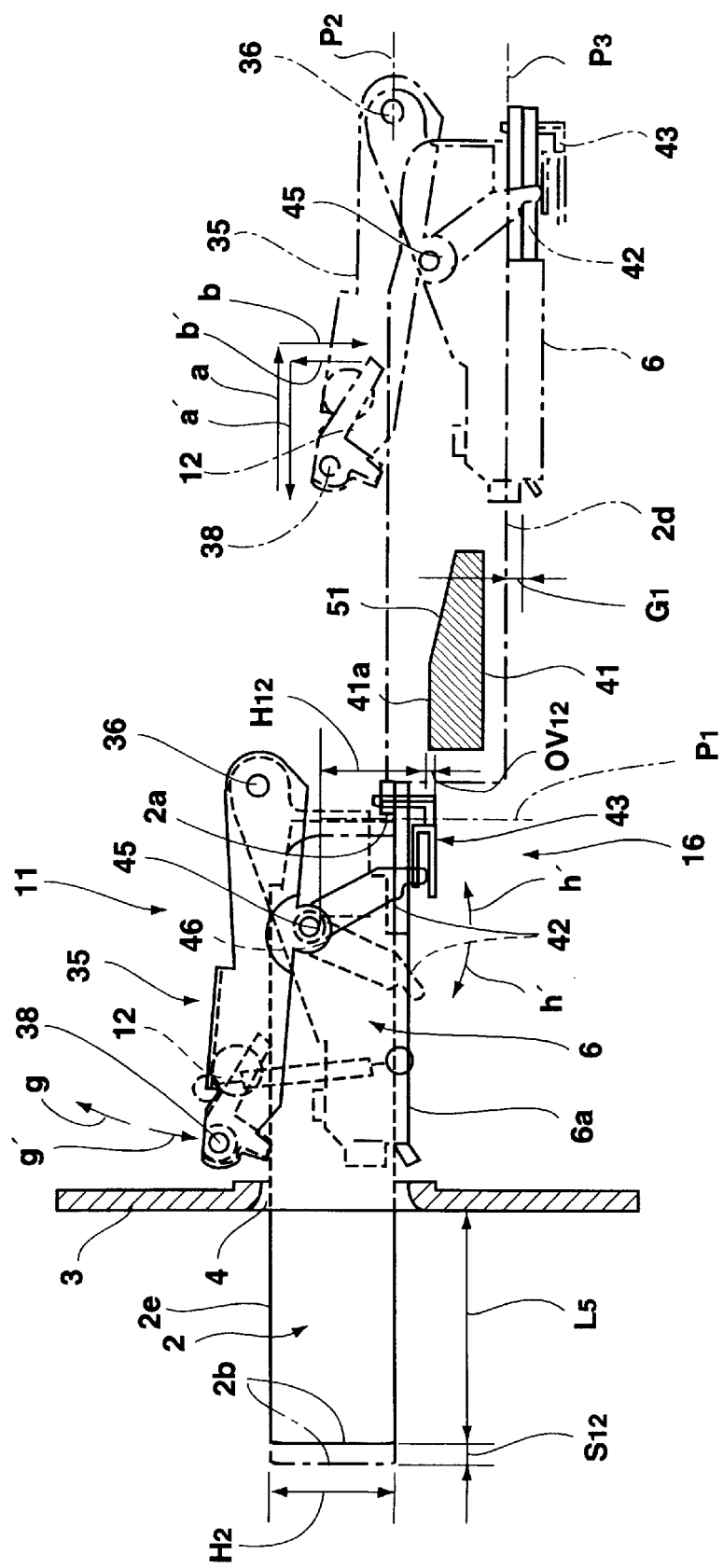
FIG. 11A and FIG. 11B are partially sectional side views illustrating large tape cassette loading and ejecting operations of the cassette stage.
Figure 11B:
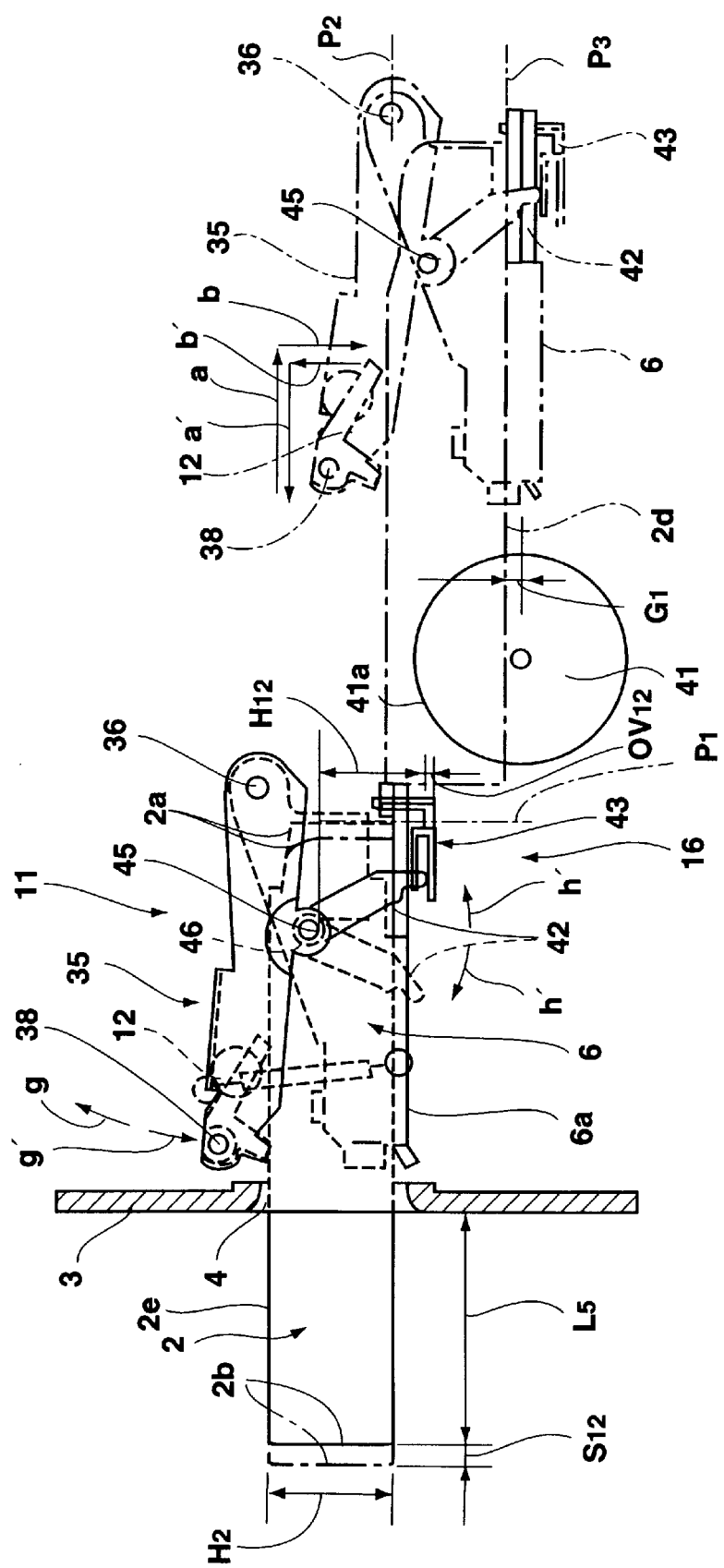

As shown in FIG. 3, FIG. 11A and FIG. 11B, the cassette ejection stroke switching means 17 switches the ejection stroke of the tape cassettes 1, 2 of the cassette ejecting levers 43 by using vertical movement of the slide member following levers 42 in the arrow g, g' direction, which is an up-down direction, accompanying movement of the cassette pressing lever 35 to provide a difference between the amounts of overlap $OV_{11}$, $OV_{12}$ of the lower ends of these slide member following levers 42 with the cam surfaces 41a of the left-right pair of slide members 41.

As shown in FIG. 15 to FIG. 20, a cassette mis-insertion preventing mechanism 18 is made up of a left-right pair of pivoting cassette discriminating members 19 molded out of synthetic resin or the like, a cassette insertion guide 20 and a left-right pair of lock levers 23.

A support member 52 disposed in a substantially upward-facing U-shape along the lower edge and left and right side edges of the cassette insertion opening 4 on the inner side of the front panel 3 is fixed to the front ends of the left-right pair of chassis side plates 44. The cassette discriminating members 19, the cassette insertion guide 20 and the lock levers 23 are respectively mounted on this support member 52 pivotally in the arrow d, d' direction, the arrow e, e' direction and the arrow j, j' direction by way of horizontal support pins 21, 22, 24. The cassette discriminating members 19, the cassette insertion guide 20 and the lock levers 23 are respectively urged to pivot in the arrow d', e, j' directions by discriminating member springs 53, insertion guide springs 54 and lock springs 55 which are rotational urging means consisting of torsion coil springs.

The left-right pair of cassette discriminating members 19 are disposed at the left and right ends of the cassette insertion opening 4 in positions adjacent to the inner side of the front panel 3, and cassette discriminating parts 19a integrally formed on the upper ends of the cassette discriminating members 19 are inserted into the left and right ends of the cassette insertion opening 4. On the inner and outer sides respectively of the rear ends of these cassette discriminating members 19 are integrally formed horizontal engaging pins 19b, 19c.

The cassette insertion guide 20 is horizontally disposed extending in a direction perpendicular to the cassette insertion direction (the arrow a direction), and this cassette insertion guide 20 has projection parts 20a formed at its left and right ends and a concave part 20b formed in its central part. Insertion guide surfaces 56 for guiding a small tape cassette 1 into the central part of the cassette stage 6 are formed on inner side facing surfaces of left and right sides of the concave part 20b, and front end faces on the outer sides of the insertion guide surface 56 form a left-right pair of cassette stopper surfaces 57.

Figure 18:
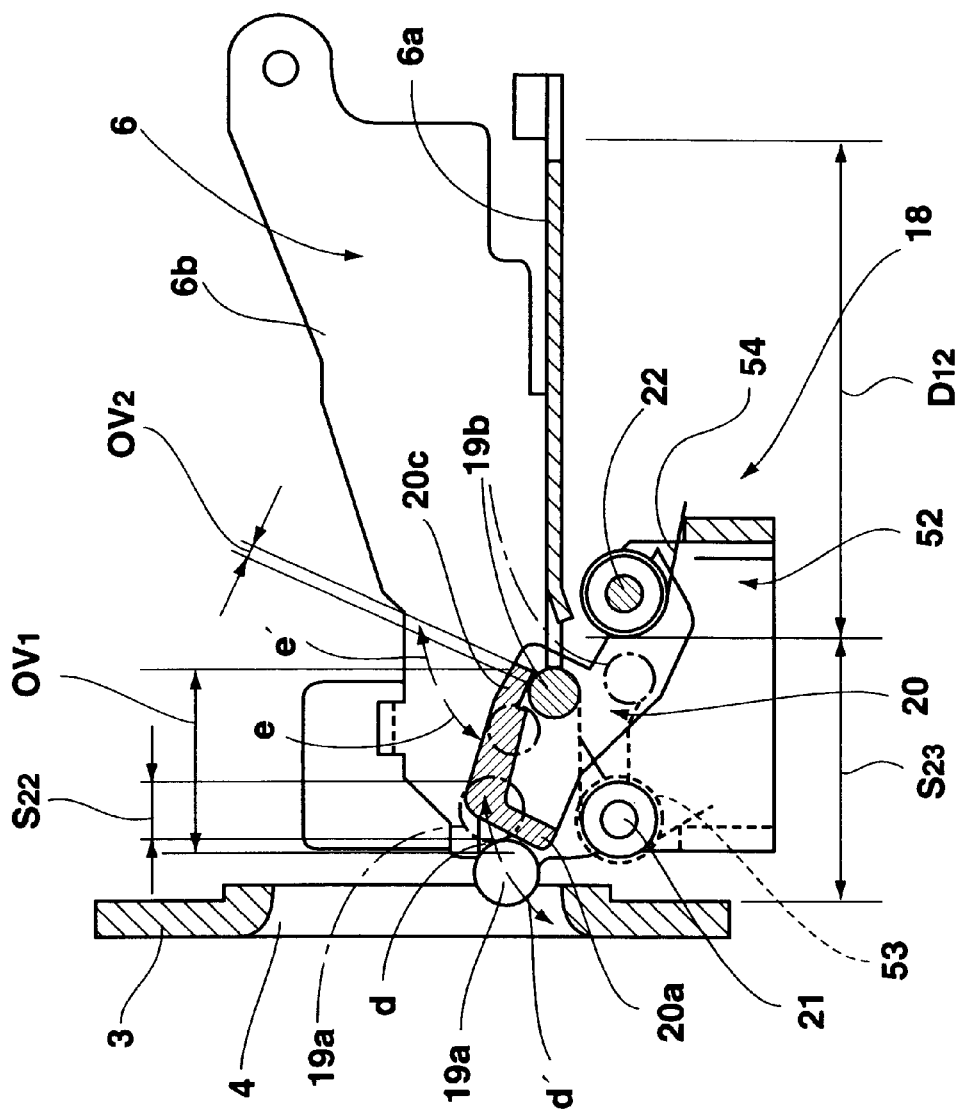
FIG. 18 is a partially sectional side view illustrating a small tape cassette mis-insertion prevention operation of the cassette insertion guide.

This cassette insertion guide 20 is disposed in a position on the cassette insertion direction side (the arrow a direction side) of the cassette discriminating members 19. As shown in FIG. 18, the left-right pair of support pins 22 disposed on the cassette insertion direction ends of the cassette insertion guide 20 are so disposed that when the cassette stage 6 has been returned to the cassette insertion position they are below the bottom plate 6a of the cassette stage 6.

Figure 19:
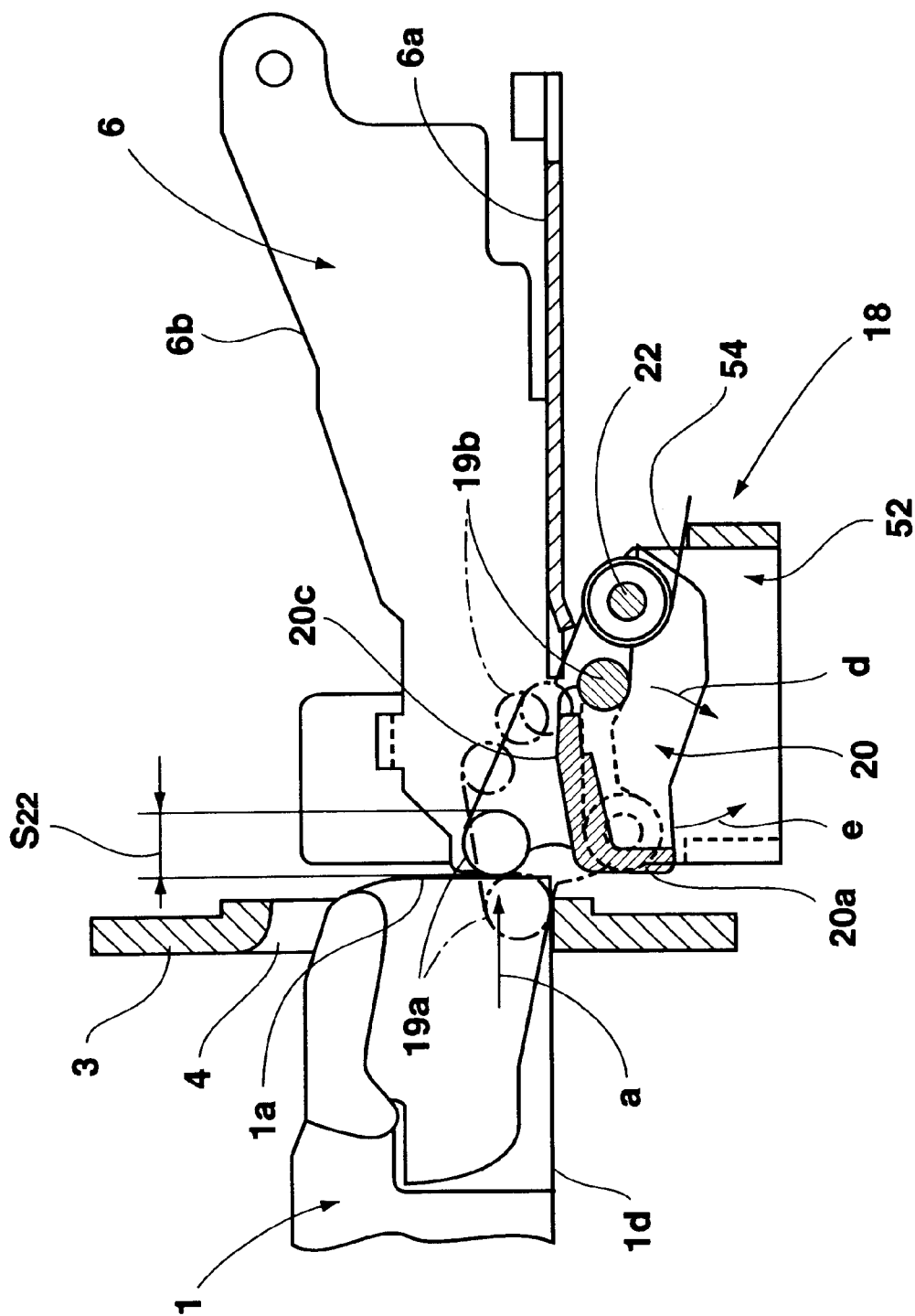
FIG. 19 is a partially sectional side view illustrating an operation of detecting a large tape cassette carried out by the cassette discriminating members.

By this cassette insertion guide 20 being driven to pivot about the support pins 22 in the arrow e, e' direction, the left-right pair of projection parts 20a having the insertion guide surfaces 56 and the cassette stopper surfaces 57 can pass through a left-right pair of cutaways 58 formed in the left and right ends of the front side of the bottom plate 6a of the cassette stage 6 and rise and fall in the arrow e, e' direction between a position above the bottom plate 6a, which is in the cassette insertion space, shown in FIG. 18 and a position below the bottom plate 6a, which is outside the cassette insertion space, shown in FIG. 19.

A left-right pair of engaging sections 20c are horizontally integrally formed on the outer sides of the left-right pair of projection parts 20a of the cassette insertion guide 20, and the left-right pair of engaging pins 19b on the inner sides of the cassette discriminating members 19 are engaged with the engaging sections 20c from below.

Thus, by the cassette discriminating members 19 and the cassette insertion guide 20 being disposed with a large mutual overlap $OV_1$ in the cassette insertion and ejection direction (the arrow a, a' direction) and, as will be further discussed later, the operating stroke $S_{22}$ through which the cassette discriminating members 19 move to remove the cassette insertion guide 20 to below the cassette insertion space being made a small stroke, the space $S_{23}$ occupied by the cassette mis-insertion preventing mechanism 18 in the cassette insertion and ejection direction is made very small.

As a result of this, as shown in FIG. 18, while bringing the cassette stage 6 amply close to the front panel 3 when the cassette stage 6 is returned to the cassette insertion position $P_1$ it is also possible to make the depth $D_{12}$ in the front-rear direction (the arrow a, a' direction) of the bottom plate 6a of the cassette stage 6 large.

By the amount of engagement $OV_2$ of the engaging pins 19b of the cassette discriminating members 19 with the engaging sections 20c of the cassette insertion guide 20 being set very small, the operating stroke $S_{22}$ of the cassette discriminating members 19 is set to a small stroke.

The left-right pair of lock levers 23 are disposed on the cassette insertion direction side (the arrow a direction side) of the cassette discriminating members 19, and lock arms 23a which lock the outer side engaging pins 19c of the cassette discriminating members 19 and cam following arms 23b controlled by the cassette stage 6 are integrally formed with these lock levers 23 in an approximate L-shape.

A left-right pair of horizontal cam arms 59 which control the cam following arms 23b are integrally formed on the outer sides of the front ends of the left-right pair of side plates 6b of the cassette stage 6.

Description of Operation of Preferred Embodiment

Next, on the basis of FIG. 2A through FIG. 20, the operation of the mechanisms in the preferred embodiment of the invention described above will be explained.

Description of Operation of Cassette Mis-insertion Preventing Mechanism

First, on the basis of FIG. 15 through FIG. 20, the operation of the cassette mis-insertion preventing mechanism 18 will be explained.

First, in an initial state of this cassette mis-insertion preventing mechanism 18, as shown with solid lines in FIG. 20, as a result of the cassette stage 6 having being returned to the cassette insertion position $P_1$ in the arrow a' direction, the left-right pair of cam arms 59 thereof are mounted up on the cam following arms 23b of the left-right pair of lock levers 23 in the arrow a direction.

These lock levers 23 have been pivoted about the support pins 24 to a lock-released position against the resistance of the lock springs 55 in the arrow j' direction, and their lock arms 23a have disengaged from the engaging pins 19c of the cassette discriminating members 19 in the arrow j' direction.

As shown in FIG. 18, the left-right pair of cassette discriminating members 19 have been driven to pivot about the support pins 21 by the discriminating member springs 53 in the arrow d' direction to an initial position, their cassette discriminating parts 19a have been inserted into the cassette insertion opening 4 and these cassette discriminating members 19 have abutted with and been stopped by the stoppers (not shown) formed on the support members 52.

The engaging pins 19b of these cassette discriminating members 19 have pushed up the engaging sections 20c of the cassette insertion guide 20 in the arrow d' direction, which is upward, and the cassette insertion guide 20 has been pivoted about the support pins 22 against the resistance of the insertion guide springs 54 in the arrow e' direction, which is upward, and the projection parts 20a of this cassette insertion guide 20 have passed through the cutaways 58 in the bottom plate 6a of the cassette stage 6 and project to a position above the bottom plate 6a.

Thus, in the state wherein the cassette stage 6 has been returned to the cassette insertion position $P_1$, the insertion guide surfaces 56 and cassette stopper surfaces 57 of the cassette insertion guide 20 project above the bottom plate 6a of the cassette stage 6.

Figure 15:
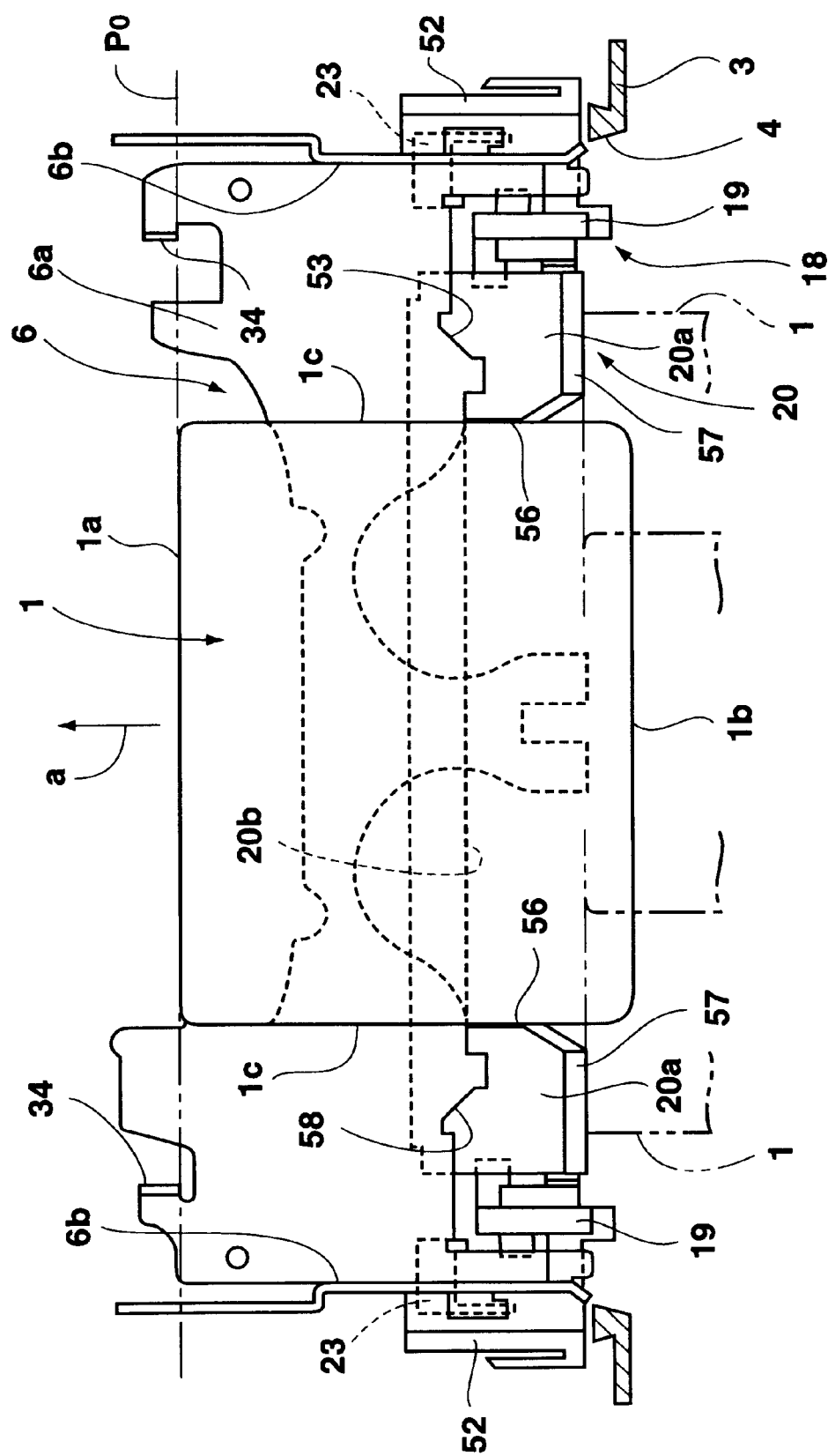
FIG. 15 is a partially sectional plan view showing cassette discriminating members and a cassette insertion guide of the apparatus.
Figure 16:
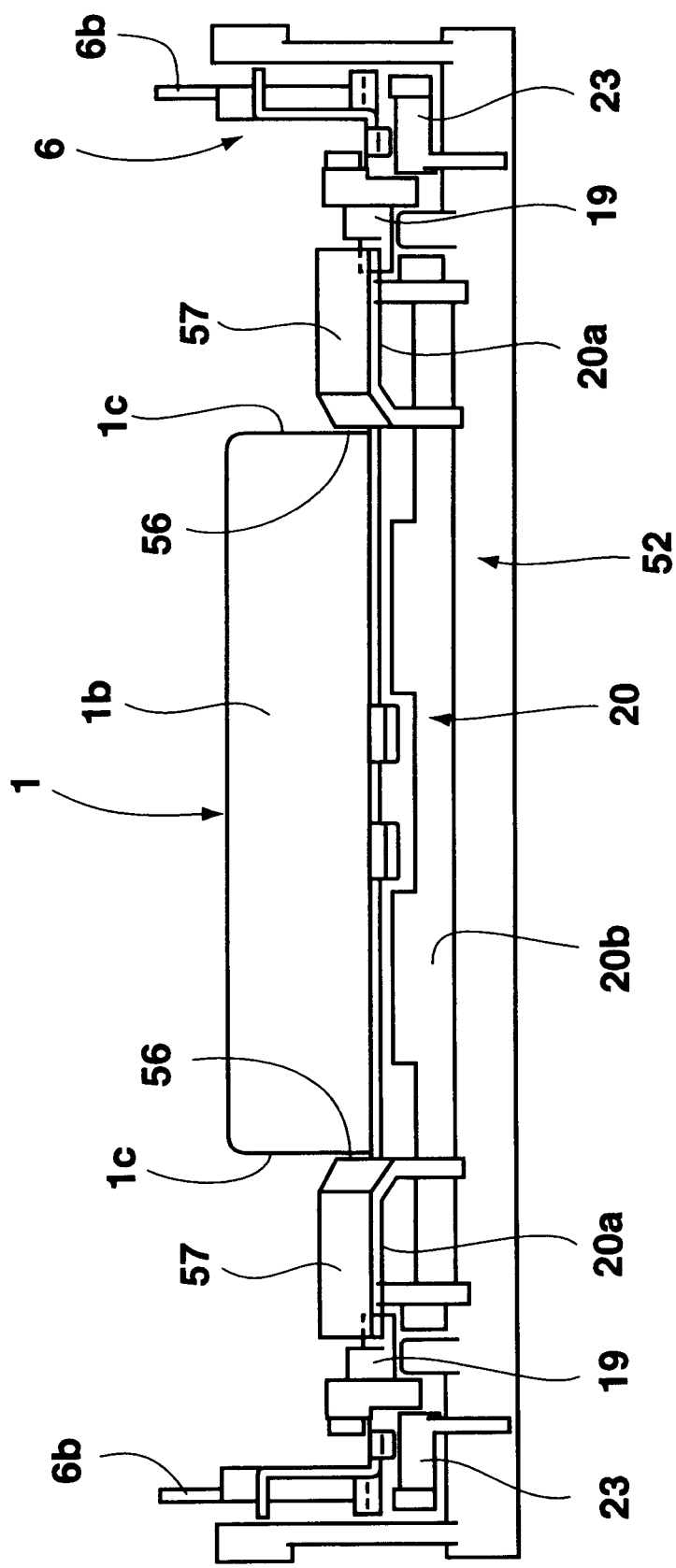
FIG. 16 is a plan view of FIG. 15.
Figure 17:
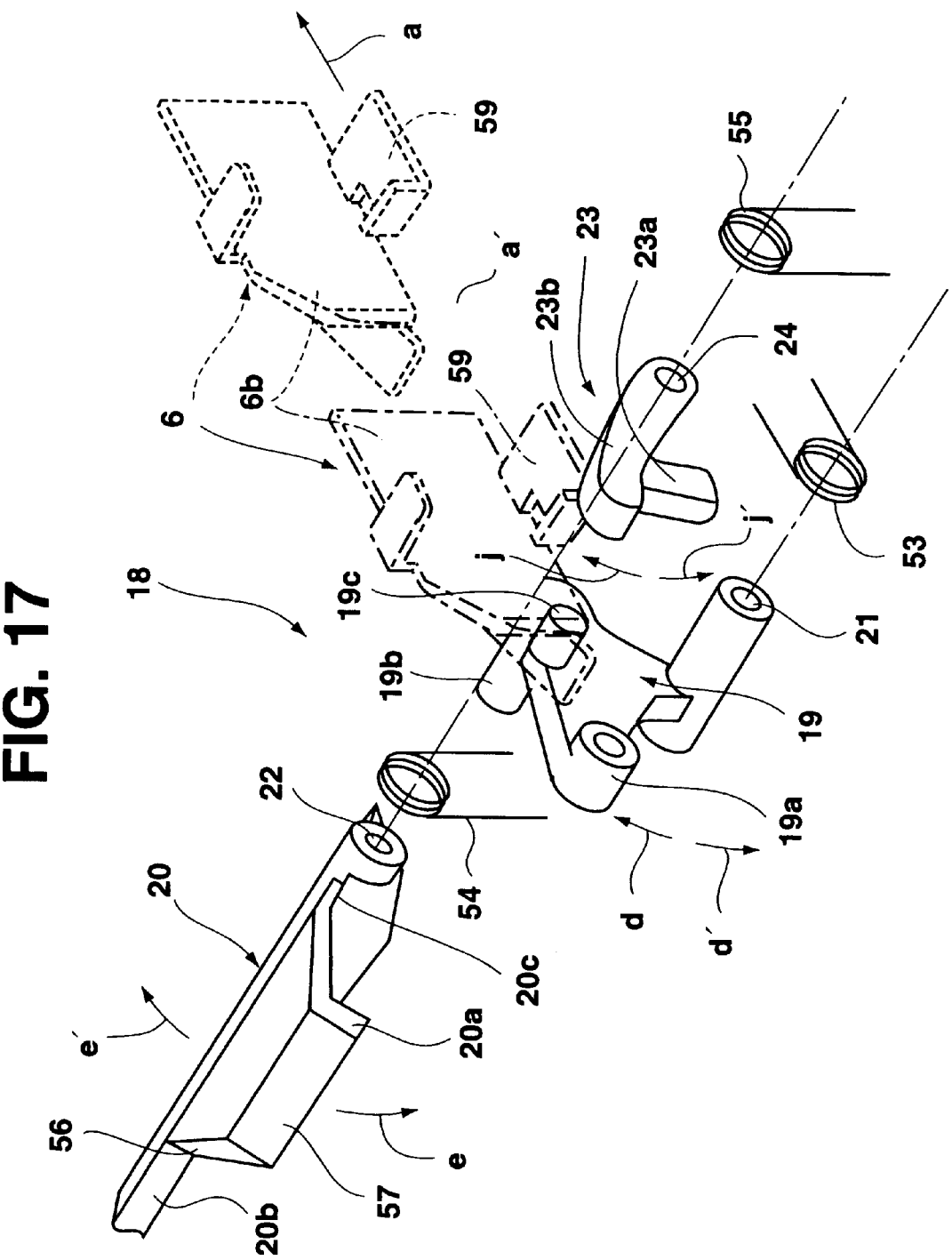
FIG. 17 is a perspective view showing a cassette discriminating member, a cassette insertion guide and a lock lever of the apparatus.

From this state, small and large tape cassettes 1, 2 are selectively inserted into the cassette stage 6 through the cassette insertion opening 4. As shown in FIG. 15, when a small tape cassette 1 is correctly inserted horizontally in the arrow a direction to a substantially central position inside the cassette stage 6 through the cassette insertion opening 4, the left-right pair of insertion guide surfaces 56 of the cassette insertion guide 20 guide left and right side surfaces 1c of the small tape cassette 1 and the small tape cassette 1 is correctly guided to a central position on the bottom plate 6a in the cassette stage 6.

The small tape cassette 1 inserted horizontally to the central position in the cassette stage 6 in the arrow a direction is stopped by a cassette stopper (not shown) when its front end 1a has become aligned with an insertion reference position $P_0$ common with a large tape cassette 2.

On the other hand, as shown with broken lines in FIG. 15, when a small tape cassette 1 is mis-inserted in the arrow a direction to an off-center position to the right or the left of the center of the cassette insertion opening 4, the front end 1a of that small tape cassette 1 collides with one of the left-right pair of cassette stopper surfaces 57 of the cassette insertion guide 20.

Therefore, mis-insertion of a small tape cassette 1 to an off-center position to the right or the left of the center of the inside of the cassette stage 6 is prevented by the cassette insertion guide 20.

Figure 12:
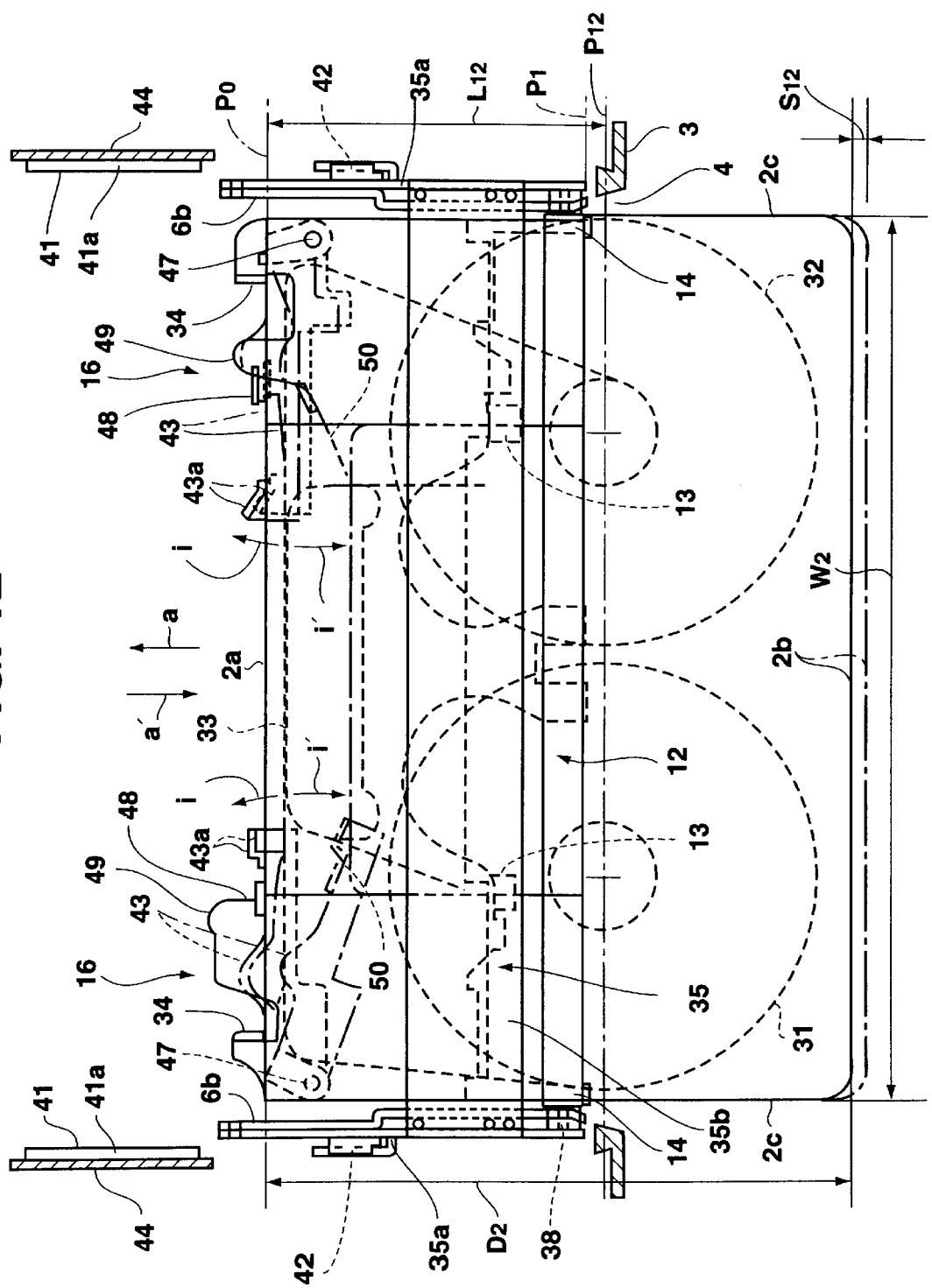
FIG. 12 is a plan view of FIG. 11A and FIG. 11B.

As shown in FIG. 12, when a large tape cassette 2 has been inserted horizontally into the cassette stage 6 through the cassette insertion opening 4 in the arrow a direction, left and right side surfaces 2c of that large tape cassette 2 are guided by the left and right side plates 6b of the cassette stage 6. This large tape cassette 2 is inserted in the arrow a direction as far as a position where its front end 2a becomes aligned with the insertion reference position $P_0$ common with the small tape cassette 1 and is stopped by the left-right pair of cassette stoppers 34.

At this time, as shown in FIG. 19, just by the large tape cassette 2 being inserted extremely slightly into the cassette insertion opening 4 in the arrow a direction, the left and right ends of the front surface of the front cover 2A of the large tape cassette 2 abut with the cassette discriminating parts 19a of the left-right pair of cassette discriminating members 19 and push them in the arrow a direction.

When this happens, the cassette discriminating members 19 are pivoted about the support pins 21 in the arrow d direction against the resistance of the discriminating member springs 53, but when these cassette discriminating members 19 have been pivoted in the arrow d direction through the small stroke $S_{22}$ equivalent to the stroke of engagement $OV_2$ of the engaging pins 19b with the engaging sections 20c from the original position shown with solid lines in FIG. 18 to the changeover position shown with broken lines in FIG. 18, the engaging pins 19b of these cassette discriminating members 19 disengage in the arrow a direction from the left-right pair of engaging sections 20c of the cassette insertion guide 20, as shown in FIG. 19.

As this happens, the cassette insertion guide 20 is pivoted about the support pins 22 by the insertion guide springs 54 in the arrow e direction, and the left-right pair of projection parts 20a of the cassette insertion guide 20 are thereby removed to below the bottom plate 6a of the cassette stage 6.

Thus, as soon as the large tape cassette 2 is inserted into the cassette insertion opening 4 in the arrow a direction by an extremely small amount, the insertion guide surfaces 56 and cassette stopper surfaces 57 of the cassette insertion guide 20 are swiftly removed to below the cassette insertion space. The large tape cassette 2 can then continue to be inserted smoothly in the arrow a direction as far as the insertion reference position $P_0$ inside the cassette stage 6 without stopping and without any hindrance.

As a result of the progress of this continuous insertion of the large tape cassette 2 in the arrow a direction, as shown in FIG. 20, the cassette discriminating parts 19a of the left-right pair of cassette discriminating members 19 are pushed down to below the lower surface 2d of the large tape cassette 2, and these cassette discriminating members 19 are pivoted in the arrow d direction as far as the lock position in which they are shown in FIG. 20.

Then, the insertion of the large tape cassette 2 into the cassette stage 6 ends and as will be further discussed later the cassette stage 6 is loaded from the cassette insertion position $P_1$ via the cassette pulling in position $P_2$ to the cassette loading position $P_3$, and at the moment the cassette stage 6 is moved horizontally in the arrow a direction from the cassette insertion position $P_1$ shown with solid lines in FIG. 20 toward the cassette pulling in position $P_2$, the left-right pair of engaging arms 59 of the cassette stage 6 are disengaged in the arrow a direction from the cam following arms 23b of the left-right pair of lock levers 23.

When this happens, these lock levers 23 are pivoted by the lock springs 55 in the arrow j direction about the support pins 24 from the lock-released position shown with solid lines in FIG. 20 to the lock position shown with broken lines in FIG. 20, and their lock arms 23a move to above the engaging pins 19c of the left-right pair of cassette discriminating members 19 and thereafter the cassette discriminating members 19 are locked in the position of FIG. 20 by these lock arms 23a.

Then, as will be discussed later, when after recording and/or reproducing is carried out on the tape cassette 1 or 2 the cassette stage 6 is returned in the arrow a' direction from the cassette loading position $P_3$ via the cassette pulling in position $P_2$ to the cassette insertion position $P_1$ shown in FIG. 20, as described above, the left-right pair of engaging cams 59 mount up on the cam following arms 23b of the left-right pair of lock levers 23 and these lock levers 23 are pivoted in the arrow j' direction against the resistance of the lock springs 55 to the lock-released position shown with solid lines in FIG. 20. When this happens, the lock arms 23a of the lock levers 23 disengage from the engaging pins 19c of the left-right pair of cassette discriminating members 19 in the arrow j direction and the locking of these cassette discriminating members 19 is released.

Then, after the return of this cassette stage 6 to the cassette insertion position $P_1$, when the large tape cassette 2 is taken out from inside the cassette stage 6 to outside the front panel 3 in the arrow a' direction, as shown with solid lines in FIG. 18, the left-right pair of cassette discriminating members 19 are pivoted by the discriminating member springs 53 to their original position in the arrow d' direction, and by the engaging pins 19b the cassette insertion guide 20 is pushed up in the arrow e' direction against the resistance of the insertion guide springs 54 and the cassette mis-insertion preventing mechanism 18 is returned to its initial position.

Description of Operation of Cassette Pressing Mechanism

Next, on the basis of FIG. 3 through FIG. 14, the operation of the cassette pressing mechanism 11 will be explained.

Figure 8:
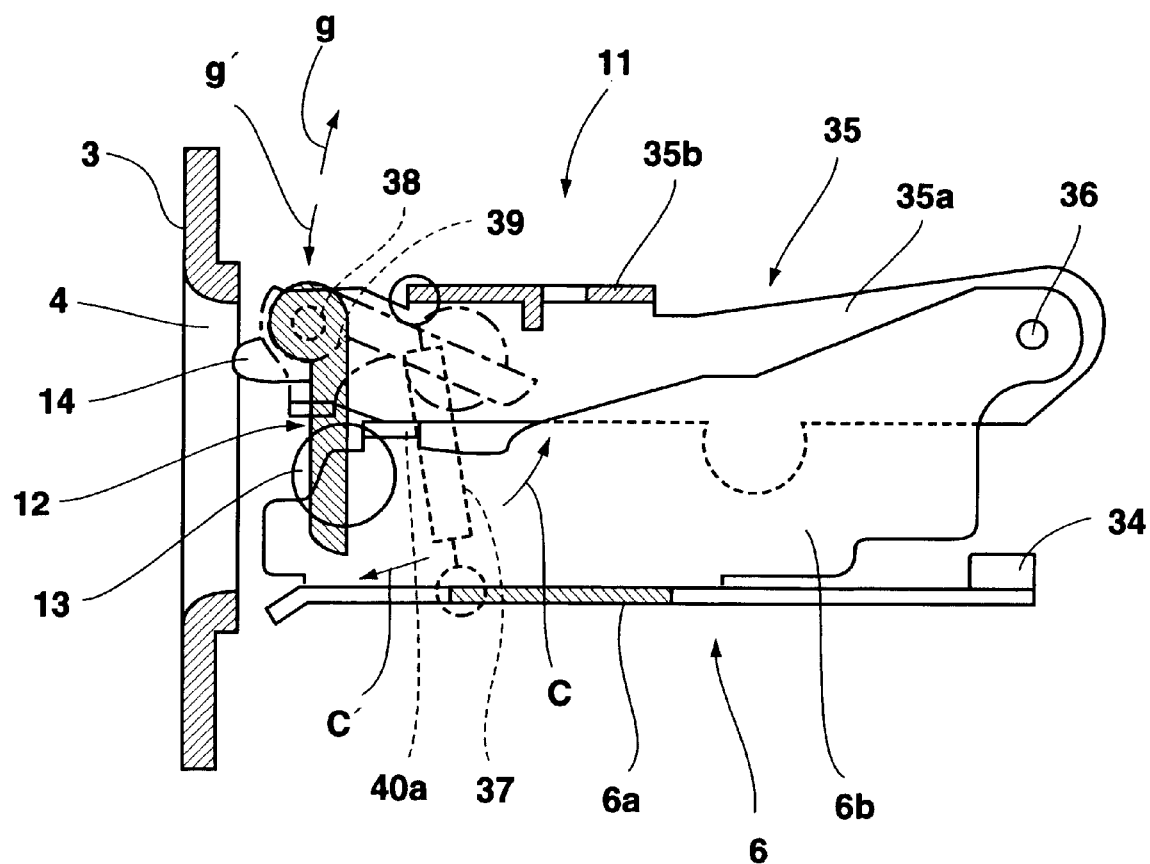
FIG. 8 is a partially sectional side view showing a cassette insertion opening in a front panel of the apparatus closed by an opening and closing cover of the cassette stage.

First, before the start of cassette loading, as shown in FIG. 8, the opening and closing cover 12 has been urged to pivot in the arrow c' direction about the support pins 38 by the opening and closing cover springs 39 to its closed position, and the cassette insertion opening 4 of the front panel 3 is closed from the inside by this opening and closing cover 12.

Figure 9:
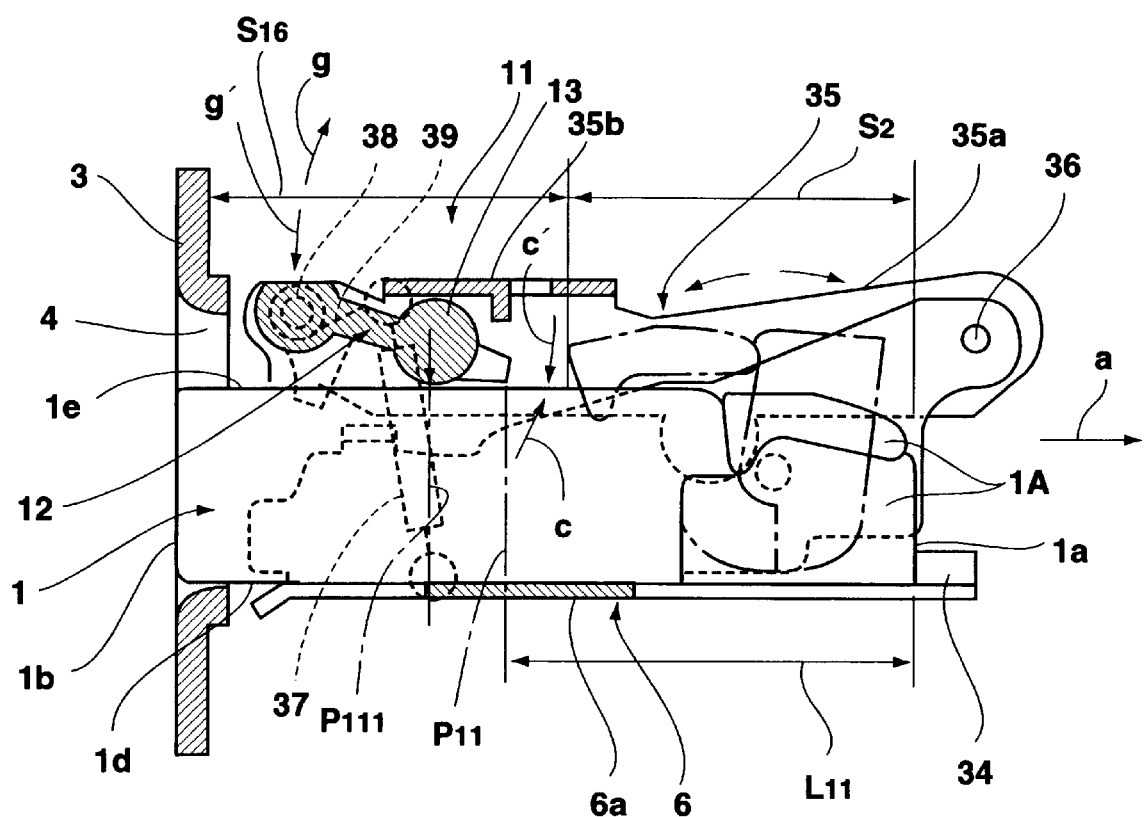
FIG. 9 is a partially sectional side view showing pressing of a small tape cassette inserted into the cassette stage.
Figure 13:
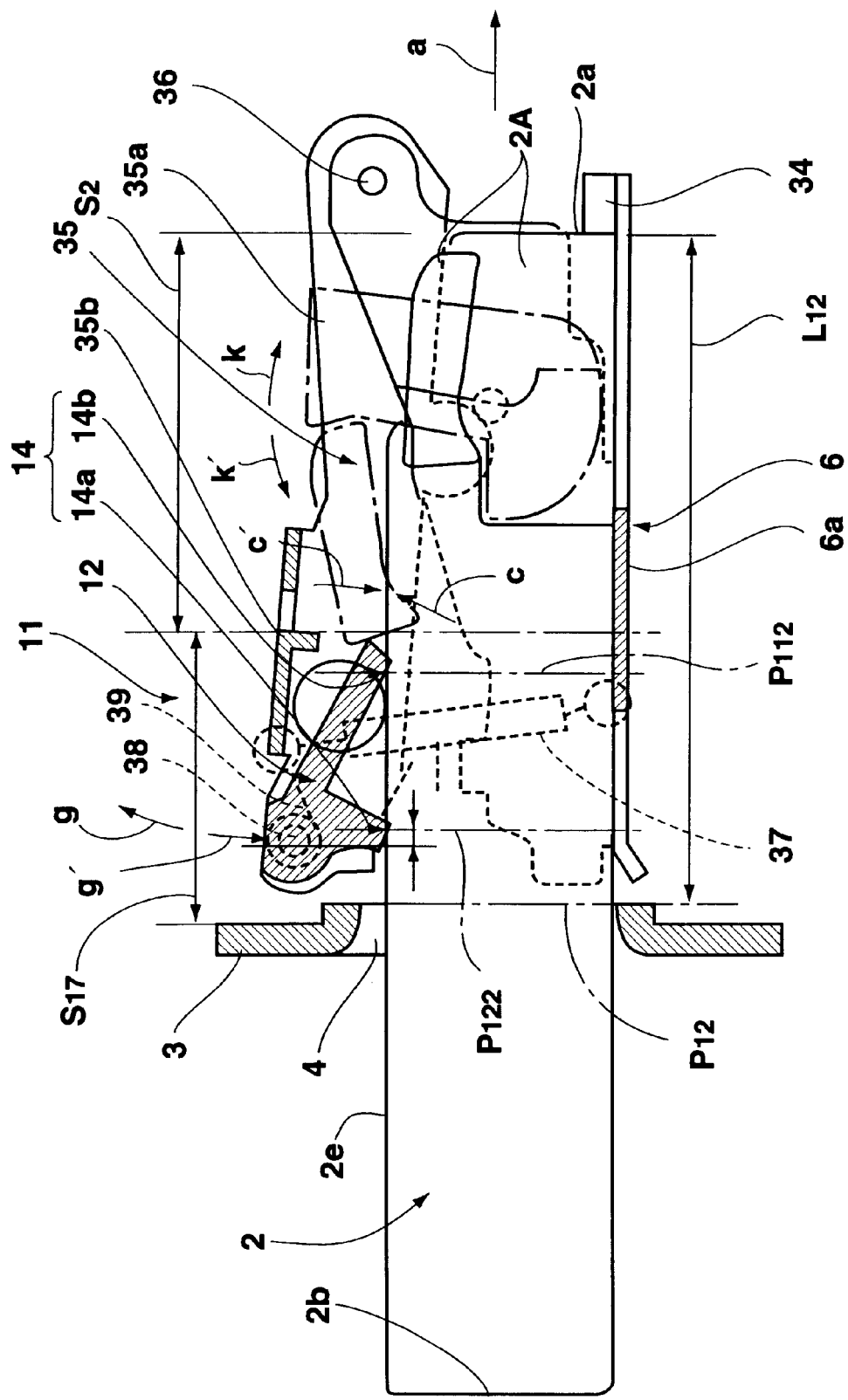
FIG. 13 is a partially sectional side view illustrating pressing of a large tape cassette being inserted into the cassette stage.

Then, during cassette loading, as shown with solid lines in FIG. 9 and FIG. 13, when small and large tape cassettes 1, 2 are selectively passed through the cassette insertion opening 4 from their front ends 1a, 2a and horizontally inserted into the cassette stage 6 in the arrow a direction, the opening and closing cover 12 is pushed in the arrow a direction by the front ends 1a, 2a of these small and large tape cassettes 1, 2 and pivots open about the support pins 38 in the arrow c direction against the resistance of the opening and closing cover springs 39.

Then, as shown in FIG. 3 and FIG. 12, these small and large tape cassettes 1, 2 are inserted horizontally in the arrow a direction as far as the insertion reference position $P_0$ inside the cassette stage 6 and stopped by the cassette stoppers. At this time, as shown in FIG. 3, a small tape cassette 1 is guided by the cassette insertion guide 20 of the cassette mis-insertion preventing mechanism 18 described above to a central position in the cassette stage 6 and a large tape cassette 2 is inserted between the left and right side plates 6b of the cassette stage 6.

Then, as shown in FIG. 9, when a small tape cassette 1 has been inserted horizontally in the arrow a direction into the cassette stage 6, the left-right pair of cassette pressing parts 13 for a small tape cassette 1 of the opening and closing cover 12 pushed open in the arrow c direction make contact with the upper surface 1e of the small tape cassette 1 and these cassette pressing parts 13 make contact with the underside of the crossbeam part 35b of the cassette pressing lever 35 and push this cassette pressing lever 35 up so as to pivot it about the support pins 36 against the resistance of the cassette pressing springs 37 through a small angle in the arrow g direction.

Then, the reaction force in the arrow g' direction of the cassette pressing lever 35 exerted by the cassette pressing springs 37 acts as a cassette pressing force, and the bottom surface 1d of the small tape cassette 1 is pressed and held horizontal on the bottom plate 6a of the cassette stage 6 by the cassette pressing parts 13.

Furthermore, at this time, the cassette pressing parts 13 press a position $P_{111}$ in the vicinity of the reel center position $P_{11}$ of the small tape cassette 1 and the small tape cassette 1 is therefore held inside the cassette stage 6 with extremely good stability.

On the other hand, as shown in FIG. 13, when a large tape cassette 2 has been inserted horizontally in the arrow a direction into the cassette stage 6, the left-right pair of cassette pressing parts 13 for a small tape cassette 1 do not make contact with the large tape cassette 2 and the two pairs of projections for cassette pressing 14a, 14b of the left-right pair of cassette pressing parts 14 for a large tape cassette 2 of the opening and closing cover 12 pushed open in the arrow c direction are brought into contact with the upper surface 2e of the large tape cassette 2.

At this time, the left-right pair of cassette pressing parts 13 for a small tape cassette 1 do not make contact with the underside of the crossbeam part 35b of the cassette pressing lever 35, and while the opening and closing cover 12 pivots in the arrow c direction, by the left-right pair of support pins 38 thereof the cassette pressing lever 35 is pushed up in the arrow g direction and pivots through a large angle in the arrow g direction about the support pins 36 against the resistance of the cassette pressing springs 37.

Therefore, at this time, the cassette pressing force due to the reaction force in the arrow g' direction of the cassette pressing lever 35 exerted by the cassette pressing springs 37 becomes larger in correspondence with the greater weight of the large tape cassette 2, and by the cassette pressing parts 14 the bottom surface 2d of the large tape cassette 2 is strongly pressed and held horizontal on the bottom plate 6a of the cassette stage 6.

At this time, the total of four projections for cassette pressing 14a, 14b of the left-right pair of cassette pressing parts 14 strongly press a position $P_{112}$ in the vicinity of the reel center position $P_{12}$ of the large tape cassette 2, and the large tape cassette 2 is therefore held inside the cassette stage 6 with extremely good stability.

As a result of the left-right pairs of cassette pressing parts 13, 14 thus being integrally formed with the opening and closing cover 12, which is a single cassette pressing member, as shown in FIG. 9 and FIG. 13, pressable spaces $S_{16}$, $S_{17}$ of the small and large tape cassettes 1, 2 pressable by the left-right pairs of cassette pressing parts 13, 14 can be made wide spaces extending to the front panel 3 on the cassette ejection direction (the arrow a' direction) side of the space $S_2$ for allowing opening and closing of their front covers 1A, 2A.

After completion of the selective insertion of the small and large tape cassettes 1, 2 into the cassette stage 6, as shown in FIG. 4, FIG. 11A and FIG. 11B, the cassette stage 6 is loaded in the arrow a, b directions from the cassette insertion position $P_1$ shown with solid lines to the cassette loading position $P_3$ shown with broken lines via the cassette pulling in position $P_2$, and these small and large tape cassettes 1, 2 are loaded horizontally to the cassette loading position $P_3$ in the arrow b direction.

When this happens, as shown with broken lines in FIG. 3, FIG. 11A and FIG. 11B, whereas the small and large tape cassettes 1, 2 are loaded onto positioning pins (not shown) in the cassette loading position $P_3$ and thereby positioned, the cassette stage 6 is moved to a position slightly below the cassette loading position $P_3$, and a step $G_1$ is formed between the lower surfaces 1d, 2d of these small and large tape cassettes 1, 2 and the bottom plate 6a of the cassette stage 6.

Therefore, with the small and large tape cassettes 1, 2 loaded to the cassette loading position $P_3$, by an amount corresponding to the step $G_1$, the cassette pressing lever 35 pivots further in the arrow g direction against the resistance of the cassette pressing springs 37, and the cassette pressing force exerted thereby increases further.

Thus, not only do the cassette pressing parts 13, 14 respectively optimally press the reel center vicinity positions $P_{111}$, $P_{112}$ of the tape cassettes 1, 2, which are positions near the centers of gravity in the front-rear direction of the tape cassettes 1, 2, as described above, but also the cassette pressing force exerted by the left-right pair of cassette pressing springs 37 is increased after the tape cassettes 1, 2 are loaded into the cassette loading position $P_3$, and as a result these small and large tape cassettes 1, 2 are firmly pressed in the arrow b direction and positioned with extremely good stability in the cassette loading position $P_3$.

Description of Cassette Ejecting Mechanism

Next, on the basis of FIG. 3 through FIG. 14, the operation of the cassette ejecting mechanism 16 will be explained.

First, as shown in FIG. 4 and FIG. 13, when the small and large tape cassettes 1, 2 are selectively inserted horizontally in the arrow a direction as far as the insertion reference position $P_0$ inside the cassette stage 6, the cassette ejecting projections 43a of the left-right pair of cassette ejecting levers 43 are pushed in the arrow a direction by the front ends 1a, 2a of these small and large tape cassettes 1, 2, and these cassette ejecting levers 43 are driven to pivot in the arrow i direction about the left-right pair of support pins 47 from an original position shown with broken lines in FIG. 4 to an ejection operation starting position shown with solid lines in FIG. 4 and FIG. 13.

After this, as shown in FIG. 3, FIG. 11A and FIG. 11B, by the cassette stage 6 these small and large tape cassettes 1, 2 are loaded in the arrow a, b directions from the cassette insertion position $P_1$ via the cassette pulling in position $P_2$ to the cassette loading position $P_3$, but while the cassette stage 6 is pulled in horizontally in the arrow a direction from the cassette insertion position $P_1$ shown in FIG. 1A to the cassette pulling in position $P_2$, the left-right pair of cam following levers 42 abut with the left-right pair of slide members 41 in the arrow a direction and these cam following levers 42 pivot and yield in the arrow h' direction about the support pins 45 against the resistance of the following lever springs 46 as shown with dotted lines in FIG. 3, FIG. 11A and FIG. 11B and pass over the left-right pair of slide members 41.

Figure 7:
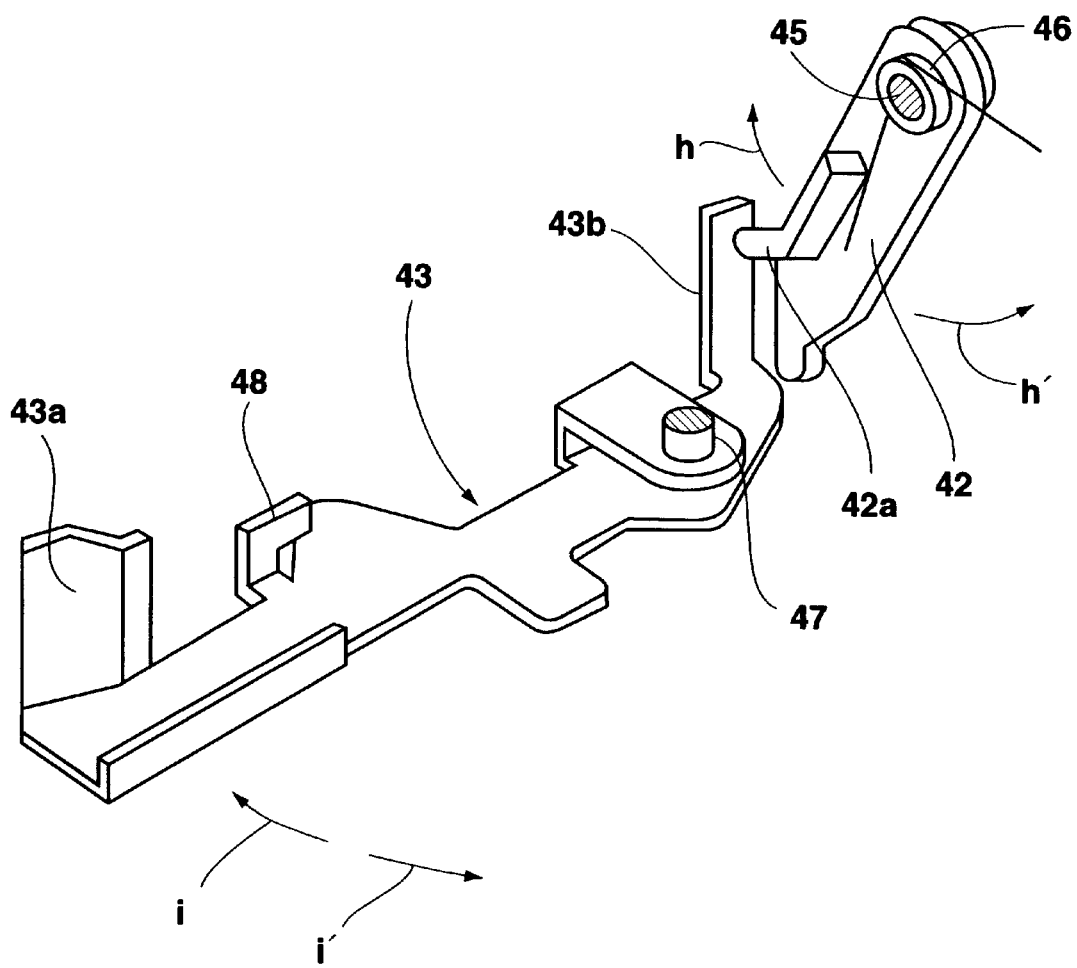
FIG. 7 is a perspective view of a cam following lever and an ejecting lever of the apparatus.

After that, these cam following levers 42 are pivoted in the arrow h direction about the support pins 45 by the following lever springs 46 as far as the ejection operation starting position shown with solid lines in FIG. 3, FIG. 11A and FIG. 11B and, as shown in FIG. 7, the projections 42a of these cam following levers 42 abut with the projections 43b of the left-right pair of cassette ejecting levers 43 in the arrow b direction.

When after recording and/or reproducing has been carried out on the small or large tape cassette 1, 2 in the cassette loading position $P_3$ the tape cassette 1, 2 is ejected by the cassette stage 6 in the arrow b', a' directions from the cassette loading position $P_3$ shown with broken lines in FIG. 3, FIG. 11A and FIG. 11B via the cassette pulling in position $P_2$ to the cassette insertion position $P_1$, and while the cassette stage 6 is moved horizontally in the arrow a' direction from the cassette pulling in position $P_2$ shown in FIG. 1A to the cassette insertion position $P_1$, the tape cassette 1, 2 is automatically ejected in the cassette ejection direction (the arrow a' direction) from the cassette stage 6.

Figure 14:
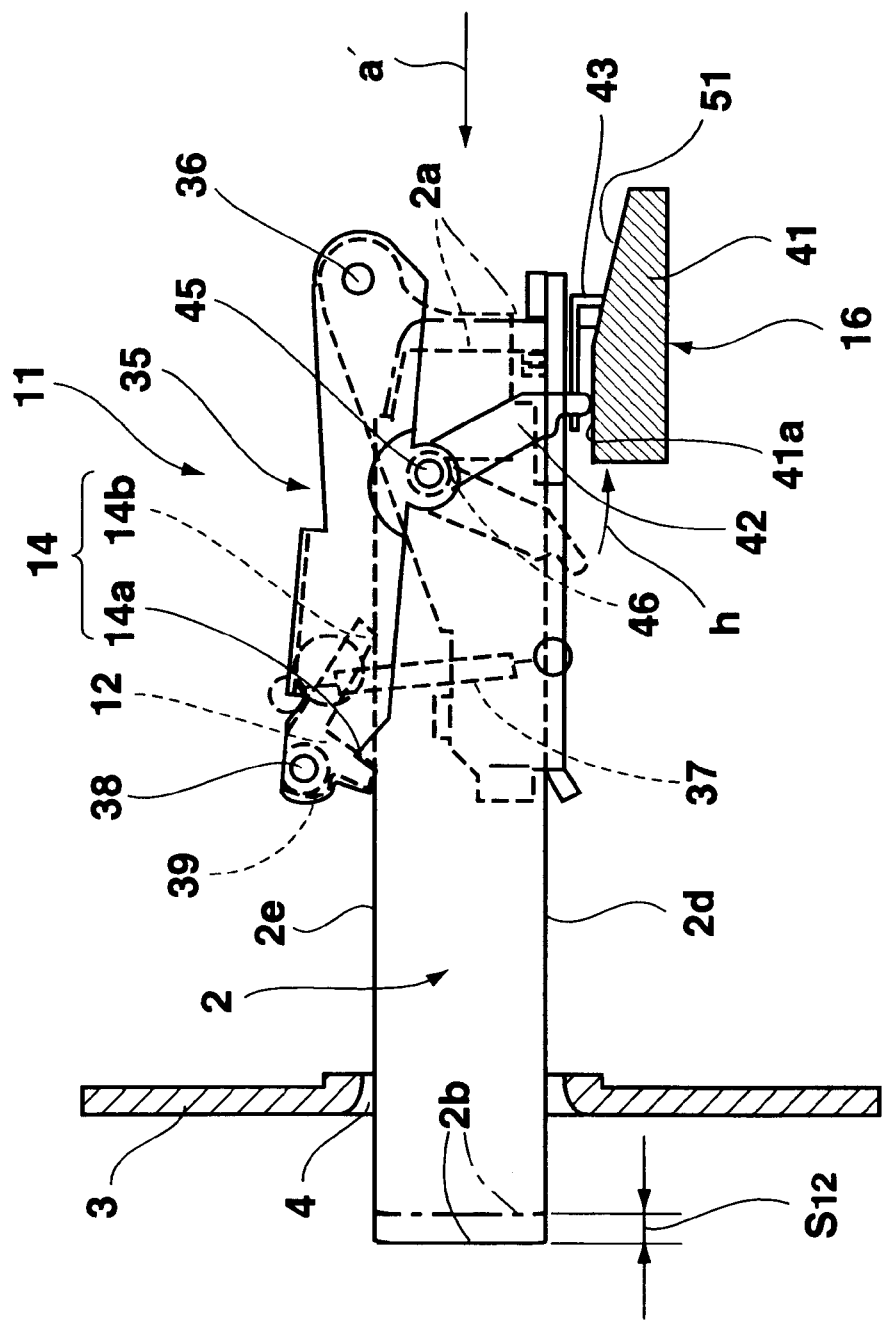
FIG. 14 is a partially sectional side view illustrating a cassette ejecting operation of ejecting a large tape cassette from the apparatus.

That is, while the cassette stage 6 is moved horizontally in the arrow a' direction, as shown in FIG. 10B and in FIG. 14, the lower ends of the cam following levers 42 abut with the cam surfaces 41a of -the left-right pair of slide members 41 and by these slide members 41 these cam following levers 42 are relatively moved back in the arrow a direction.

When this happens, these cam following levers 42 are driven to pivot about the support pins 45 in the arrow h direction and, as shown in FIG. 7, the projections 43b of the left-right pair of cassette ejecting levers 43 are driven in the arrow h direction by the projections 42a of these cam following levers 42, and these cassette ejecting levers 43 are forcibly driven to pivot in the arrow i' direction about the support pins 47 from the ejection operation starting position shown in FIG. 4 and FIG. 12 with solid lines.

When this happens, as shown in FIG. 3, FIG. 4, FIG. 11A, FIG. 11B and FIG. 12, the front ends 1a, 2a of the small and large tape cassettes 1, 2 are pushed in the arrow a' direction by these cassette ejecting projections 43a, and these small and large tape cassettes 1, 2 are forcibly ejected in the cassette ejection direction (the arrow a' direction) from inside the cassette stage 6.

At this time, by the ejection stroke switching means 17 making use of the step of the thicknesses $H_1$, $H_2$ of the small and large tape cassettes 1, 2 these ejection strokes $S_{11}$, $S_{12}$ are automatically switched and whereas a small tape cassette 1 is ejected in the arrow a' direction through a large ejection stroke $S_{11}$, as shown in FIG. 3 and FIG. 4, the ejection stroke $S_{12}$ of a large tape cassette 2 is kept small, as shown in FIG. 11A, FIG. 11B and FIG. 12.

That is, as shown in FIG. 3, when a small tape cassette 1 is ejected, because the thickness $H_1$ thereof is small, the distance pivoted in the arrow g direction, which is upward, of the cassette pressing lever 35 in the cassette pressing mechanism 16 described above is small, and because the support pins 45 of the cam following levers 42 rise only slightly with respect to the bottom plate 6a of the cassette stage 6, the overlap amount $OV_{11}$ of the lower ends of these cam following levers 42 and the slide surfaces 41a of the slide members 41 becomes large.

Therefore, as shown in FIG. 10B, during ejection of a small tape cassette 1, the distance pivoted by the cam following levers 42 when driven to pivot in the arrow h direction by the left-right pair of slide surfaces 41a becomes large, and these left-right pair of cam following levers 42 drive the cassette ejecting levers 43 to pivot through a large angle in the arrow i' direction from the ejection operation starting position shown with solid lines in FIG. 4 to the original position shown with broken lines. Consequently, the small tape cassette 1 ejection stroke $S_{11}$ becomes large.

On the other hand, as shown in FIG. 11A and FIG. 11B, during ejection of a large tape cassette 2, because the thickness $H_2$ thereof is large, the distance pivoted in the arrow g direction, which is upward, by the cassette pressing lever 35 in the cassette pressing mechanism 16 described above is large, the support pins 45 of the cam following levers 42 are lifted to a high position with respect to the bottom plate 6a of the cassette stage 6, and the overlap amount $OV_{12}$ of the lower ends of these cam following levers 42 with the cam surfaces 41a of the slide members 41 becomes small.

Therefore, as shown in FIG. 14, during ejection of a large tape cassette 1, the distance pivoted by the cam following levers 42 when driven to pivot in the arrow h direction by the cam surfaces 41a becomes small, and these cam following levers 42 drive the cassette ejecting levers 43 to pivot through a small angle in the arrow i' direction from the ejection operation starting position shown with solid lines in FIG. 12 to the ejection position shown with broken lines. Consequently, the large tape cassette 2 ejection stroke $S_{12}$ is kept small.

As shown in FIG. 3 and FIG. 4, when ejection of a small tape cassette 1 has been completed, the rear end 1b of that small tape cassette 1 projects in the arrow a' direction to outside the front panel 3 through the cassette insertion opening 4 by a large projection distance $L_1$, and after completion of this ejection the rear end 1b of this small tape cassette 1 can be gripped by hand and easily taken out in the arrow a' direction to outside the front panel 3.

On the other hand, as shown in FIG. 11A, FIG. 11B and FIG. 12, when ejection of a large tape cassette 2 has been completed, the projection distance $L_5$ of the rear end 2b of the large tape cassette 2 in the arrow d' direction to outside the front panel 3 through the cassette insertion opening 4 is kept smaller than in the related art, and risks such as that of the rear end 2b accidentally colliding with and injuring a hand or a body of an operator or the large tape cassette 2 accidentally dropping out of the apparatus are avoided.

Description of Operation of Pressing Force Changing Means

Next, on the basis of FIG. 3, FIG. 4 and FIG. 10A, the operation of the pressing force changing means 15 as it relates to a small tape cassette 1 will be described.

First, as shown in FIG. 3, during loading of a small tape cassette 1, as described above, the cassette pressing force $F_1$ exerted by the left-right pair of cassette pressing springs 37 when that small tape cassette 1 is inserted horizontally into the cassette stage 6 through the cassette insertion opening 4 in the arrow a direction and by the left-right pair of cassette pressing parts 13 of the cassette pressing mechanism 11 that small tape cassette 1 is pressed onto the bottom plate 6a of the cassette stage 6 in the arrow g' direction is set to a strong value.

On the other hand, as described above, when during ejection of a small tape cassette 1 the small tape cassette 1 is ejected from the cassette stage 6 by the cassette ejecting mechanism 16 in the arrow a direction, the cassette pressing force exerted by the above-mentioned cassette pressing springs 37 is changed over to a weak value $F_2$.

That is, as shown in FIG. 10A, during ejection of a small tape cassette 1 in the arrow a' direction, the lower ends of the cam following levers 42 reach the cam surfaces 41a, which are slide surfaces, after sliding up the sloping surfaces 51 of the left-right pair of cams 41, which are slide members, in the arrow a' direction, and during this time these cam following levers 42 are driven to pivot in the arrow h direction and as described with reference to FIG. 3 and FIG. 4 the small tape cassette 1 is ejected from inside the cassette stage 6 in the arrow a' direction by the cassette ejecting levers 43.

Part-way through this ejection of the small tape cassette 1 there is a point at which a cassette ejecting load due to the cassette pressing force $F_1$ exerted by the cassette pressing springs 37 and the driving force of the cassette ejecting levers 43 in the arrow i' direction balance and pivoting of the cam following levers 42 in the arrow h direction stops.

When this happens, due to the left-right pair of sloping surfaces 51 a thrust force $F_3$ acting diagonally upward, which is a normal direction with respect to the sloping surfaces 51, acts on the cam following levers 42, and due to that thrust force $F_3$ an arrow h direction turning moment M on the cassette pressing lever 35 about the support pins 36 arises. This turning moment M is $M=F_3 \times r$.

As a result of this turning moment M acting on the cassette pressing lever 35 the cassette pressing force exerted by the cassette pressing springs 37 is changed over from the strong value $F_1$ to the weak value $F_2$.

At the instant the cassette pressing force is weakened to $F_2$, the cassette ejecting levers 43 are smoothly driven to pivot by the left-right pair of cam following levers 42 in the arrow i' direction as far as the original position shown with broken lines in FIG. 4, and the small tape cassette 1 is smoothly ejected from inside the cassette stage 6 in the arrow a' direction through the ejection stroke $S_{11}$.

At this time, the left-right pair of cassette ejecting levers 43 are certainly driven to pivot in the arrow i' direction to the original position where their cassette ejecting projections 43a abut with the cassette ejection stoppers 50 of the bottom plate 6a of the cassette stage 6 and are thereby stopped, and the small tape cassette 1 is always stably and correctly ejected from inside the cassette stage 6 through the ejection stroke $S_{11}$.

A preferred embodiment of the invention has been described above, but the invention is not limited to the preferred embodiment described above, and various changes are possible on the basis of the technological concept of the invention.

For example, the invention is not limited to a video cassette recorder, and can be applied to cassette type recording and reproducing apparatuses of other kinds.

A cassette type recording and reproducing apparatus of the invention constructed as described above provides the following benefits.

With a cassette type recording and reproducing apparatus according to the first aspect of the invention, it is possible to hold tape cassettes of a plurality of types whose sizes differ with a cassette stage with good stability and certainly and carry out cassette loading and ejecting operations between a cassette insertion position and a cassette loading position with good stability and effectively prevent cassette loading errors.

Furthermore, it is not necessary to use a complicated mechanism which forcibly pulls in a tape cassette to a cassette stage disposed in a position far back from a cassette insertion opening using cassette pressing rollers or the like rotationally driven by a motor, the structure is simple and low cost and it is possible to make the overall cassette loading mechanism compact.

With a cassette type recording and reproducing apparatus according to the second aspect of the invention, because when the cassette discriminating member is pushed and caused to pivot by a large tape cassette slightly in the cassette insertion direction against the resistance of the second urging means the cassette insertion guide can be pivoted and removed to outside the cassette insertion space immediately by the first urging means, the overall space in the cassette insertion direction occupied by the cassette insertion guide and the cassette discriminating member can be made much smaller and insertion a large tape cassette into the cassette stage of can be carried out smoothly.

With a cassette type recording and reproducing apparatus according to the third aspect of the invention, because the cassette insertion guide is disposed oriented in a direction perpendicular to the cassette insertion direction and small tape cassette insertion guide surfaces are formed on both sides of the center of the cassette insertion guide and cassette stopper surfaces for preventing small tape cassettes from being mis-inserted are provided on both sides of the small tape cassette insertion guide surfaces and cassette discriminating members are provided at both ends of the cassette insertion opening, it is possible to guide a small tape cassette certainly to the center of the cassette stage and reliably prevent a small tape cassette from being mis-inserted to an off-center position to the right or the left of the center of the cassette stage.

With a cassette type recording and reproducing apparatus according to the fourth aspect of the invention, because a cassette discriminating part of the cassette discriminating member is disposed inside the cassette insertion opening, cassette type discrimination can be carried out just by inserting a large tape cassette slightly into the cassette insertion opening.

With a cassette type recording and reproducing apparatus according to the fifth aspect of the invention, because the ejection stroke of the cassette ejecting mechanism is switched by ejection stroke switching means utilizing a difference in the thicknesses of the tape cassettes and the ejection stroke of the small tape cassette is made large and the ejection stroke of the large tape cassette is made small, the distance by which the rear end of a small tape cassette projects to outside the front panel on completion of ejection of the small tape cassette can be made large so that thereafter the rear end of the small tape cassette can be easily gripped by hand and the tape cassette can be easily removed from the apparatus. On completion of ejection of a large tape cassette, on the other hand, the distance by which the rear end of the large tape cassette projects to outside the front panel is not too great and it is possible to avoid risks such as that of the rear end of the large tape cassette projecting to outside the front panel accidentally striking and injuring the hand or body of a user or of the cassette loading mechanism breaking or of the large tape cassette accidentally falling out of the cassette insertion opening, and safety is thereby increased.

With a cassette type recording and reproducing apparatus according to the sixth aspect of the invention, because on cassette ejection the amount by which the cassette ejecting lever is driven by the following lever is changed in correspondence with a change in the amount of overlap of the cam following lever with respect to the slide member caused by a difference in the thicknesses of tape cassettes of a plurality of types and the ejection stroke of a small tape cassette is made large and thereby the ejection stroke of a large tape cassette is made small, it is not necessary to for example provide two cassette ejecting mechanisms each operating independently according to the thickness of the tape cassette being ejected and it is possible to switch the ejection stroke using the same ejecting lever, and simplification of the construction and cost reduction made possible by reducing the number of parts and assembly labor can be realized.

With a cassette type recording and reproducing apparatus according to the ninth aspect of the invention, because when the tape cassette is loaded by the cassette stage from the cassette insertion position to the cassette loading position the cassette pressing force exerted by the cassette pressing mechanism is increased by the pressing force changing means to prevent the tape cassette from slipping out of position on the cassette stage, it is possible to load the tape cassette correctly and firmly into the cassette loading position. Therefore, tape cassette loading errors can be prevented and the travel of the magnetic tape does not become unstable due to vibration caused by outside disturbances and the like during recording or reproducing and cause recording or reproducing errors, and it is possible to realize a cassette type recording and reproducing apparatus whose performance is not readily affected by outside disturbances.

Also, because when the tape cassette is ejected by the cassette stage from the cassette loading position to the cassette insertion position the cassette pressing force exerted by the cassette pressing mechanism is decreased by the pressing force changing means and the tape cassette can be smoothly and certainly ejected from the cassette stage through a fixed distance by the cassette ejecting mechanism, when the tape cassette has been returned to the cassette insertion position the rear end of the tape cassette can be stably made to project by a fixed distance to outside the front panel and the tape cassette can be easily gripped by hand and taken out of the apparatus.

With a cassette type recording and reproducing apparatus according to the tenth aspect of the invention, because a following lever driving a cassette ejecting lever of the cassette ejecting mechanism to pivot is pivotally attached to the cassette pressing lever pivotally attached to the cassette pressing mechanism and pressing force changing means is made up of this following lever and a sloping surface formed on a slide member mounted in a fixed position which relatively drives the following lever to pivot, during cassette loading it is possible to create a strong cassette pressing force mainly by means of the cassette pressing lever independently of the pressing force changing means, and during cassette ejecting, when the following lever mounts the sloping surface of the slide member, the following lever pushes up the cassette pressing lever and weakens the cassette pressing force exerted by the cassette pressing lever and the tape cassette can be smoothly and certainly ejected from the cassette stage through a fixed distance by the cassette ejecting lever. Also, because the following lever of the cassette ejecting mechanism is used to constitute the pressing force changing means, the construction is simple and a low cost cassette type recording and reproducing apparatus can be realized.

With a cassette type recording and reproducing apparatus according to the eleventh aspect of the invention, because a cassette ejection stopper for controlling the position at which the cassette ejecting lever stops in the cassette ejection direction is provided, the distance through which the tape cassette is ejected from the cassette stage can be correctly kept to a fixed value and the operation of removing the tape cassette from the apparatus can always be carried out easily.

With a cassette type recording and reproducing apparatus according to the fourteenth aspect of the invention, because the tape cassette is pressed by a cassette pressing part of an opening and closing cover attached to the cassette stage itself and opening and closing the cassette insertion opening in the front panel from the inner side thereof, without using a complicated mechanism which forcibly pulls the tape cassette to the back of the cassette stage with a cassette pressing roller or the like it is possible to press the tape cassette in an optimal position to the rear of the space through which the front cover of the tape cassette moves and consequently it is possible to press the reel center vicinity position of the tape cassette, which is approximately the position of the center of gravity of the tape cassette, with good stability and a cassette type recording and reproducing apparatus whose performance is not readily affected by outside disturbances can thereby be realized.

With a cassette type recording and reproducing apparatus according to the fourteenth aspect of the invention, because it is not necessary to use a complicated mechanism for forcibly pulling the tape cassette to the back of the cassette stage with cassette pressing rollers or the like and furthermore it is possible to make the opening and closing cover for opening and closing the cassette insertion opening in the front panel from the inner side thereof double as cassette pressing means, it is possible to greatly reduce the number of parts and assembly labor and it is possible to simplify and reduce the cost of the construction.

With a cassette type recording and reproducing apparatus according to the fifteenth aspect of the invention, because a cassette pressing lever is provided pivotally attached to the cassette stage and an opening and closing cover having a cassette pressing part is attached to the cassette pressing lever and the cassette pressing lever and the opening and closing cover are respectively urged by urging means to pivot in a cassette pressing direction and a cover closing direction, the operation of closing the cassette insertion opening and the operation of pressing the cassette can each be carried out smoothly and unforcedly, and it is possible to realize a cassette type recording and reproducing apparatus of high quality.

With a cassette type recording and reproducing apparatus according to the sixteenth aspect of the invention, because pivoting of the cassette pressing lever in the cassette pressing direction is limited by a stopper, it is possible to stabilize the closed position in which the opening and closing cover closes the cassette insertion opening and insertion of the tape cassette into the cassette stage through the cassette insertion opening can be carried out smoothly.

With a cassette type recording and reproducing apparatus according to a seventeenth aspect of the invention using tape cassettes of a plurality of types whose sizes differ, because without using a complicated mechanism for forcibly pulling the tape cassette to the back of the cassette stage with cassette pressing rollers or the like it is possible to optimally press reel center vicinity positions of tape cassettes of a plurality of types whose sizes differ selectively inserted into the cassette stage by means of a plurality of types of cassette pressing parts attached to the cassette stage, it is possible to press positions in the vicinities of the reel centers, which are approximately the front-rear direction positions of the centers of gravity, which also differ due to the size differences, of the tape cassettes of a plurality of types with good stability and optimally and it is possible to realize a cassette type recording and reproducing apparatus whose performance is not readily affected by outside disturbances.

Also, because it is not necessary to use a complicated mechanism for forcibly pulling the tape cassette to the back of the cassette stage with cassette pressing rollers or the like it is possible to greatly reduce the number of parts and assembly labor and realize simplification and cost reduction of the construction.

With a cassette type recording and reproducing apparatus according to the eighteenth aspect of the invention, because the cassette pressing parts of two types are provided on one cassette pressing member attached to the cassette stage, it is possible to further reduce the number of parts and assembly labor and promote simplification and cost reduction of the construction.

With a cassette type recording and reproducing apparatus according to the nineteenth aspect of the invention, because the cassette pressing member doubles as an opening and closing cover attached to the cassette stage for opening and closing a cassette insertion opening in a front panel from the inner side thereof, it is possible to use a single part for the opening and closing cover, the cassette pressing member and a plurality of types of cassette pressing parts, and further simplification and cost reduction of the construction can therefore be achieved.

What is claimed is:

1. A cassette type recording and reproducing apparatus comprising:

a front panel provided with a cassette insertion opening;

a cassette stage reciprocated between a cassette insertion position where a tape cassette is inserted into said cassette stage through said cassette insertion opening and a cassette loading position where recording and reproducing are carried out on said tape cassette;

cassette pressing means mounted on said cassette stage for pressing said tape cassette;

a cassette ejecting mechanism mounted on said cassette stage for when said cassette stage is ejected from said cassette loading position to said cassette insertion position ejecting said tape cassette from said cassette stage in a cassette ejection direction; and pressing force changing means for increasing a cassette pressing force exerted by said cassette pressing means when said cassette stage is loaded from said cassette insertion position to said cassette loading position and decreasing said cassette pressing force exerted by said cassette pressing means when said cassette stage is ejected from said cassette loading position to said cassette insertion position.

2. A cassette type recording and reproducing apparatus according to claim 1, wherein said cassette pressing means comprises a cassette pressing lever pivotally attached to said cassette stage, said cassette ejecting mechanism comprises a slide member mounted in a fixed position, a following lever pivotally attached to said cassette pressing lever and relatively driven to pivot by said slide member, and a cassette ejecting lever pivotally attached to said cassette stage and driven to pivot by said following lever, and said pressing force changing means comprises said following lever and a sloping surface formed on said slide member.

3. A cassette type recording and reproducing apparatus according to claim 1, further comprising a cassette ejection stopper mounted on said cassette stage for stopping said cassette ejecting lever in a fixed position in said cassette ejection direction.

4. A cassette type recording and reproducing apparatus according to claim 2, wherein said slide member is a cam of which a face making contact with said following lever having a sloping surface sloping downward in a cassette insertion direction.

5. A cassette type recording and reproducing apparatus according to claim 2, wherein said slide member is a roller having a circumferential face making contact with said following lever.

6. A cassette type recording and reproducing apparatus comprising:

a front panel provided with a cassette insertion opening;

a cassette stage reciprocated between a cassette insertion position where a tape cassette is inserted into said cassette stage through said cassette insertion opening and a cassette loading position where recording and reproducing are carried out on said tape cassette;

an opening and closing cover attached to said cassette stage and closing said cassette insertion opening from an inner side thereof when said cassette stage is in said cassette insertion position and opened by said tape cassette as said tape cassette is inserted into said cassette stage through said cassette insertion opening;

urging means for urging said opening and closing cover to pivot closed; and a cassette pressing part provided on said opening and closing cover for pressing said tape cassette.

7. A cassette type recording and reproducing apparatus comprising:

a front panel provided with a cassette insertion opening;

a cassette stage reciprocated between a cassette insertion position where a tape cassette is inserted into said cassette stage through said cassette insertion opening and a cassette loading position where recording and reproducing are carried out on said tape cassette;

a cassette pressing lever pivotally attached to said cassette stage;

an opening and closing cover of inwardly opening type pivotally attached to said cassette pressing lever and closing said cassette insertion opening from an inner side thereof when said cassette stage is in said cassette insertion position and opened by said tape cassette as said tape cassette is inserted into said cassette stage through said cassette insertion opening;

urging means for urging said cassette pressing lever to pivot in a cassette pressing direction;

urging means for urging said opening and closing cover to close; and a cassette pressing part provided on said opening and closing cover for pressing said tape cassette inserted into said cassette stage.

8. A cassette type recording and reproducing apparatus according to claim 7, further comprising a stopper mounted on said cassette stage for limiting pivoting of said cassette pressing lever in said cassette pressing direction.

* * * * *